US012097723B2

(12) United States Patent
Hayakawa

(10) Patent No.: US 12,097,723 B2
(45) Date of Patent: Sep. 24, 2024

(54) RETRACTABLE WRITING IMPLEMENT

(71) Applicant: Kabushiki Kaisha Pilot Corporation, Tokyo (JP)

(72) Inventor: Hisatoshi Hayakawa, Tokyo (JP)

(73) Assignee: Kabushiki Kaisha Pilot Corporation, Tokyo (JP)

( * ) Notice: Subject to any disclaimer, the term of this patent is extended or adjusted under 35 U.S.C. 154(b) by 64 days.

(21) Appl. No.: 17/629,456

(22) PCT Filed: Jul. 15, 2020

(86) PCT No.: PCT/JP2020/027427
§ 371 (c)(1),
(2) Date: Jan. 24, 2022

(87) PCT Pub. No.: WO2021/015062
PCT Pub. Date: Jan. 28, 2021

(65) Prior Publication Data

US 2022/0219482 A1 Jul. 14, 2022

(30) Foreign Application Priority Data

Jul. 25, 2019 (JP) ................................ 2019-136838

(51) Int. Cl.
*B43K 24/04* (2006.01)
*B43K 25/02* (2006.01)

(52) U.S. Cl.
CPC .............. *B43K 24/04* (2013.01); *B43K 25/02* (2013.01)

(58) Field of Classification Search
CPC ..... B43K 24/04; B43K 24/084; B43K 25/028
(Continued)

(56) References Cited

U.S. PATENT DOCUMENTS 5,336,006 A * 8/1994 Badr .................... B43K 25/028 401/105
9,108,456 B2 * 8/2015 Ito .......................... B43K 24/04
(Continued)

FOREIGN PATENT DOCUMENTS

DE 1284878 B 12/1968
EP 0630762 A1 * 12/1994 ........... B43K 25/028
(Continued)

*Primary Examiner* — David P Angwin
*Assistant Examiner* — Bradley S Oliver
(74) *Attorney, Agent, or Firm* — The Webb Law Firm

(57) ABSTRACT

Provided is a retractable writing instrument including a pen point, a barrel, and a clip. The pen point is configured to be in a state of projecting from the barrel or a state of being retracted into the barrel by sliding the clip in a longitudinal direction of the barrel. The clip includes a clip body extending in the longitudinal direction of the barrel, a ball portion provided on a front side of the clip body and projecting in a direction of a surface of the barrel, and a clip base provided on a rear side of the clip body and is configured to produce a biasing force in a direction of a surface of the barrel. The surface of the barrel includes a guide groove extending in the longitudinal direction of the barrel and provided with a pair of side surfaces to restrict lateral movement of the ball portion, and the guide groove has a through groove capable of causing the ball portion to be in a noncontact state in a direction of the biasing force at least when the pen point is in the retracted state.

13 Claims, 16 Drawing Sheets

(58) Field of Classification Search
USPC .......................................................... 401/104
See application file for complete search history.

(56) References Cited

U.S. PATENT DOCUMENTS

| | | | | |
|---|---|---|---|---|
| 9,662,927 | B2 * | 5/2017 | Rolion ................ | B43K 25/024 |
| 10,493,791 | B2 | 12/2019 | Ito | |
| 2011/0103875 | A1 | 5/2011 | Huang | |

FOREIGN PATENT DOCUMENTS

| | | | |
|---|---|---|---|
| GB | 738695 | A | 10/1955 |
| JP | H370996 | U | 7/1991 |
| JP | H08258488 | A | 10/1996 |
| JP | 2005111876 | A | 4/2005 |
| JP | 2005231317 | A | 9/2005 |
| JP | 2006334832 | A | 12/2006 |
| JP | 200755156 | A | 3/2007 |
| JP | 201146165 | A | 3/2011 |
| JP | 2012218389 | A | 11/2012 |
| JP | 2016203596 | A | 12/2016 |
| JP | 201724224 | A | 2/2017 |
| KR | 1020020077545 | A | 10/2002 |
| TW | 201831340 | A | 9/2018 |
| WO | 2011096357 | A1 | 8/2011 |

* cited by examiner

P2=0

P2=0

RETRACTABLE WRITING IMPLEMENT

CROSS-REFERENCE TO RELATED APPLICATIONS

This application is the United States national phase of International Application No. PCT/JP2020/027427 filed Jul. 15, 2020, and claims priority to Japanese Patent Application No. 2019-136838 filed Jul. 25, 2019, the disclosures of which are hereby incorporated by reference in their entirety.

BACKGROUND OF THE INVENTION

Field of the Invention

The present invention relates to a retractable writing instrument configured to a pen point to be in a state of projecting from a barrel or to be in a state of being retracted into the barrel by sliding a clip in a longitudinal direction of the barrel.

Description of Related Art

Conventionally, retractable writing instruments have been known. A general retractable writing instrument includes a columnar operating portion at the rear end of a barrel. The pen point of the retractable writing instrument is in a state of projecting from the barrel or in a state of being retracted into the barrel by pressing the columnar operating portion forward. As a special embodiment, a retractable writing instrument is configured to cause a pen point to be in a state of projecting from a barrel by sliding a clip forward of the barrel.

JP 2005-111876 A discloses a retractable writing instrument provided with a clip allowing open/close operation. The clip allowing open/close operation is configured with a clip body, a first plunger, and a biasing member. The clip body is connected to the first plunger by the biasing member. The biasing member is a U-shaped sheet metal and produces a biasing force in a direction of closing the clip body. The clip body is provided with a pair of ball portions. The pair of ball portions extend parallel to a longitudinal direction of the clip body. The barrel is provided with a convex guide portion guiding the ball portions in the longitudinal direction of the barrel. When the pen point is in a state of being retracted into the barrel, the convex guide portion is engaged between the pair of ball portions. For example, a sandwiched object, such as paper and a notebook, is sandwiched between the convex guide portion and the ball portions by the biasing force of the biasing member.

JP 2007-055156 A discloses a retractable writing instrument has a barrel provided with a guide groove to guide a ball portion of a clip body. While the clip body slides, the ball portion moves in a longitudinal direction of the barrel along the guide groove. The guide groove has a bottom surface over the entire length. The entire length of the guide groove is slightly shorter than the moving distance of the ball portion. Accordingly, when moving most forward, the ball portion overrides a step at the front end of the guide groove. In this situation, a gap is formed between the ball portion and the bottom surface of the guide groove.

WO 2011/096357 A1 discloses a retractable writing instrument provided with a clip having a clip body, a ball portion, and a clip base integrally formed of a synthetic resin as a single piece. The instrument has a barrel provided with a guide groove to guide the ball portion. The guide groove has a bottom surface over the entire length.

JP 2017-024224 A discloses a retractable writing instrument that has an elastically deformable cantilever formed integrally with a front side of a clip body made of a synthetic resin as a single piece. The cantilever has flexural rigidity lower than the flexural rigidity of the clip body. For example, a sandwiched object, such as paper and a notebook, is sandwiched by a biasing force of the elastically deformed cantilever. When a pen point is in a state of projecting from a barrel, the cantilever abuts on a surface of the barrel to produce a biasing force.

PRIOR ART DOCUMENTS

Patent Document

Patent Document 1: JP 2005-111876 A
Patent Document 2: JP 2007-055156 A
Patent Document 3: WO 2011/096357 A1
Patent Document 4: JP 2017-024224 A

SUMMARY OF THE INVENTION

Problems to be Solved by the Invention

Conventional retractable writing instruments have a structural problem that a biasing force of a clip body interferes with rearward movement of a clip. For example, in the retractable writing instrument disclosed in JP 2005-111876 A, the biasing member produces the biasing force in the direction of closing the clip body. The biasing force of the biasing member causes the ball portion of the clip body to abut on the surface of the barrel to produce frictional resistance. Meanwhile, the clip is moved rearward of the barrel by the spring biasing a writing tool body rearward. If the biasing force of the spring is not more than the frictional resistance of the ball portion, the rearward movement of the clip is stopped by the frictional resistance of the ball portion. Similarly, the biasing force of the cantilever disclosed in JP 2017-024224 A also produces frictional resistance to stop the rearward movement of the clip.

With reference to FIGS. 15A and 15B, mechanical relationship between the frictional resistance of the ball portion and the biasing force of the spring is described. FIG. 15A is a cross-sectional view illustrating a retractable writing instrument 100 in a state of a pen point projecting from a barrel 2. FIG. 15B is a cross-sectional view illustrating the retractable writing instrument 100 in a state of the pen point being retracted into the barrel 2.

As illustrated in FIGS. 15A and 15B, in the barrel 2 of the retractable writing instrument 100, a writing tool body 6 is housed. The writing tool body 6 is biased rearward of the barrel 2 by a first spring, not shown (refer to the reference sign "5" in FIG. 2B). An arrow P1 indicates an elastic force of the first spring (5). Meanwhile, the retractable writing instrument 100 has a clip 4 provided with a second spring 44 biasing a front side of a clip body 41 in the direction of a surface of the barrel 2. The second spring 44 has an elastic force causing a ball portion 42 of the clip body 41 to abut on a bottom surface 233 of a guide groove 23*f*. An arrow P2 indicates a biasing force of the clip body 41 pressed by the second spring 44.

The biasing force P2 of the clip body 41 causes the ball portion 42 to abut on the bottom surface 233 of the guide groove 23*f* to produce frictional resistance when the clip 4 moves rearward. The frictional resistance stops the rearward movement of the clip 4.

The reason for stopping the rearward movement of the clip 4 is not only the biasing force P2 of the clip body 41. Variation of the elastic force P1 in accordance with the expansion and contraction of the first spring (5) is also a reason for stopping the rearward movement of the clip 4. That is, the elastic force P1 of the first spring (5) becomes larger with the contraction of the first spring (5) and becomes smaller with the expansion of the first spring (5). The elastic force P1 of the first spring (5) is thus maximum in the projected state of the pen point illustrated in FIG. 15A and minimum in the retracted state of the pen point illustrated in FIG. 15B. In the process from the projected state to the retracted state of the pen point, if the elastic force P1 of the first spring (5) is not more than the frictional resistance of the ball portion 42, the rearward movement of the clip 4 is stopped by the frictional resistance of the ball portion 42.

To solve such a problem, it is considered to increase the elastic force P1 of the first spring (5). However, an increase in the elastic force P1 of the first spring (5) causes a greater force to be used to slide the clip 4 forward of the barrel 2 and reduction in the operability to retract and project the pen point. Accordingly, the problem of stopping the rearward movement of the clip 4 is desirably solved not by increasing the elastic force P1 of the first spring (5).

With reference to FIG. 16, a second problem caused by the biasing force of the clip body is then described. FIG. 16 is a cross-sectional view illustrating a retractable writing instrument 200 including a plurality of writing tool bodies 6A and 6B. As illustrated in FIG. 16, the plurality of writing tool bodies 6A and 6B are housed in a barrel 2 of the retractable writing instrument 200. The respective writing tool bodies 6A and 6B have a rear end attached to sliders 8A and 8B. Among them, the slider 8A has a rear side formed integrally with a clip body 41 as a single piece. The clip body 41 has a front side formed integrally with a ball portion 42 as a single piece. The clip body 41 has a shape constantly producing a biasing force P2 in a direction of a surface of the barrel 2.

The writing tool body 6A has a pen point in a state of projecting from the barrel 2. Meanwhile, the writing tool body 6B has a pen point in a state of being retracted into the barrel 2. The projected state of the pen point of the writing tool body 6A is retained by locking of a rear end portion 8*a* of the slider 8A on a locking rib 2*a* provided in the barrel 2.

However, the biasing force P2 of the clip body 41 causes the second problem of facilitating removal of locking of the rear end portion 8*a* of the slider 8A on the locking rib 2*a*. That is, the ball portion 42 of the clip body 41 receives a reaction force (refer to gray arrow in FIG. 16) in the direction opposite to the biasing force P2 from the surface of the barrel 2. The reaction force exerts a force in the direction of an arrow P3 (force in a direction away from the surface of the barrel 2) on the rear end portion 8*a* of the slider 8A. This facilitates removal of locking of the rear end portion 8*a* of the slider 8A on the locking rib 2*a*. Accordingly, the biasing force P2 of the clip body 41 causes the pen point of the writing tool body 6A to be in the retracted state from the projected state although unintended by a user of the retractable writing instrument 200.

It is an object of the present invention to provide a retractable writing instrument where normal movement of a clip is securely performed to cause a pen point to be in a retracted state and a projected state of the pen point is securely retained.

Means to Solve the Problems (1) To achieve the above object, a retractable writing instrument of the present invention includes a pen point, a barrel, and a clip, the pen point being configured to be in a state of projecting from the barrel or a state of being retracted into the barrel by sliding the clip in a longitudinal direction of the barrel, wherein the clip includes a clip body extending in the longitudinal direction of the barrel, a ball portion provided on a front side of the clip body and projecting in a direction of a surface of the barrel, and a clip base provided on a rear side of the clip body and is configured to produce a biasing force in a direction of a surface of the barrel, the surface of the barrel includes a guide groove extending in the longitudinal direction of the barrel and provided with a pair of side surfaces to restrict lateral movement of the ball portion, and the guide groove has a through groove capable of causing the ball portion to be in a noncontact state in a direction of the biasing force at least when the pen point is in the retracted state.

(2) It is preferred that, in the retractable writing instrument according to (1) above, the through groove of the guide groove has a length allowing the ball portion to be in the noncontact state in the direction of the biasing force during transfer of the pen point from the projected state to the retracted state.

(3) It is preferred that, in the retractable writing instrument according to (1) or (2) above, the barrel has a rear side provided with a slide hole to cause the clip base to slide in the longitudinal direction of the barrel, the slide hole includes a pair of side surfaces extending in the longitudinal direction of the barrel to restrict lateral movement of the clip base, and each side surface of the slide hole is continued to the corresponding side surface of the guide groove.

(4) It is preferred that, in the retractable writing instrument according to (3) above, the through groove of the guide groove is in communication with the slide hole.

(5) It is preferred that, in the retractable writing instrument according to (1) through (4) above, the guide groove has a bottom surface capable of receiving the biasing force from the clip by contacting the ball portion when the pen point is in the projected state.

(6) It is preferred that, in the retractable writing instrument according to (5) above, an inclined surface down to the through groove is formed at a rear end of the bottom surface of the guide groove.

(7) It is preferred that, in the retractable writing instrument according to (5) or (6) above, a second bottom surface separated from the bottom surface by the through groove is provided between the through groove of the guide groove and the slide hole.

(8) It is preferred that, in the retractable writing instrument according to (1) through (7) above, the clip includes a hinge connecting the clip base to the rear side of the clip body and a spring pressing the rear side of the clip body in a direction intersecting the barrel, and the clip body pressed by the spring produces the biasing force.

(9) It is preferred that, in the retractable writing instrument according to (1) through (7) above, the clip includes a leaf spring connecting the rear side of the clip body to the clip base and pressing in the direction of the surface of the barrel, and the clip body pressed by the leaf spring produces the biasing force.

(10) It is preferred that, in the retractable writing instrument according to (1) through (7) above, the clip body is configured with sheet metal, the rear side of the clip body is connected to the clip base, and the biasing force is produced by elasticity of the clip body.

(1) It is preferred that, in the retractable writing instrument according to (10) above, the clip body has a pair of side walls configured with the sheet metal.

(12) It is preferred that, in the retractable writing instrument according to (1) through (7) above, the clip body, the ball portion, and the clip base are formed of a synthetic resin, and the biasing force is produced by elasticity of the clip body.

In the retractable writing instrument of the present invention, the term "front" is defined as the direction to the pen point and the term "rear" as the direction opposite to the pen point.

Effects of the Invention

The retractable writing instrument of the present invention allows secure performance of normal movement of the clip to cause the pen point to be in the retracted state and secure retention of the projected state of the pen point.

BRIEF DESCRIPTION OF THE DRAWINGS

FIG. 1A is a side view, and FIG. 1B is a cross-sectional view.

FIG. 2A is a side view, and FIG. 2B is a cross-sectional view.

FIG. 3A is a plan view, FIG. 3B is a side view, FIG. 3C is a bottom view, FIG. 3D is a front view, FIG. 3E is a rear view, and FIG. 3F is a perspective view.

FIG. 4A is a plan view, FIG. 4B is a side view, FIG. 4C is a bottom view, FIG. 4D is a front view, FIG. 4E is a rear view, and FIG. 4F is a perspective view.

FIG. 5A is a plan view of a rear side portion of the intermediate barrel. FIG. 5B is a perspective view of the rear side portion of the intermediate barrel. FIG. 5C is a cross-sectional view of the process of assembling the clip to the intermediate barrel.

FIG. 6A is a cross-sectional view illustrating the projected state of the pen point. FIG. 6B is a cross-sectional view illustrating the retracted state of the pen point.

FIG. 7A is a plan view of a rear side portion of the intermediate barrel. FIG. 7B is a perspective view of the rear side portion of the intermediate barrel. FIG. 7C is a cross-sectional view of the process of assembling a clip to the intermediate barrel.

FIG. 8A is a cross-sectional view illustrating a projected state of a pen point. FIG. 8B is a cross-sectional view illustrating a retracted state of the pen point.

FIG. 9A is a cross-sectional view illustrating a projected state of a pen point. FIG. 9B is a cross-sectional view illustrating a retracted state of the pen point.

FIG. 10A is a cross-sectional view illustrating a projected state of a pen point. FIG. 10B is a cross-sectional view illustrating a retracted state of the pen point.

FIG. 11A is a cross-sectional view illustrating a projected state of a pen point. FIG. 11B is a cross-sectional view illustrating a retracted state of the pen point.

FIG. 12A is a cross-sectional view illustrating a projected state of a pen point. FIG. 12B is a cross-sectional view illustrating a retracted state of the pen point. FIG. 12C is a cross-sectional view illustrating a clip of the retractable writing instrument.

FIG. 14A is a cross-sectional view illustrating a projected state of a pen point. FIG. 14B is a cross-sectional view illustrating a retracted state of the pen point.

FIG. 15A is a cross-sectional view illustrating a projected state of a pen point. FIG. 15B is a cross-sectional view illustrating a retracted state of the pen point.

DESCRIPTION OF THE INVENTION

1. First Embodiment

Figure 1A:
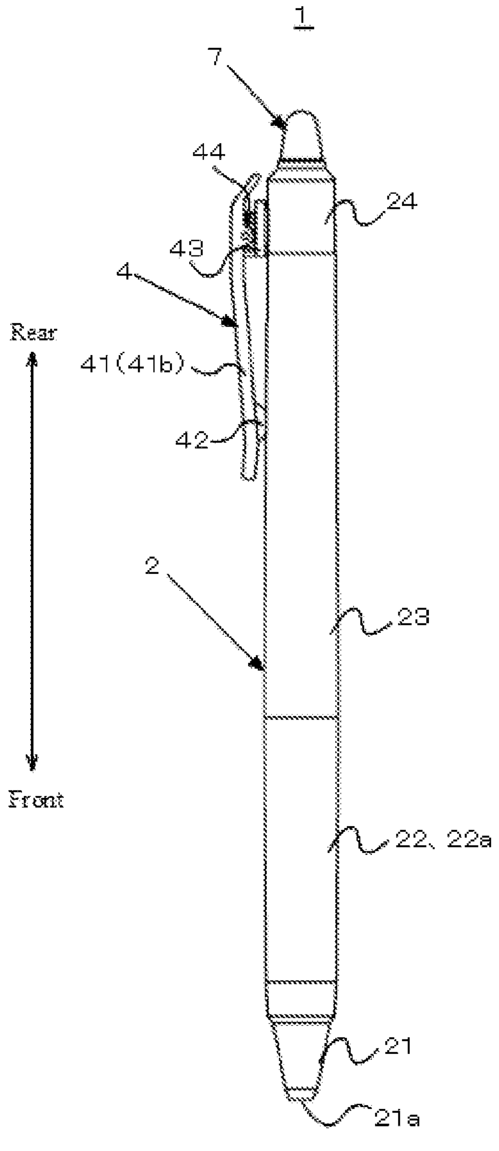
FIGS. 1A and 1B illustrate a retractable writing instrument according to a first embodiment of the present invention, the retractable writing instrument being in a state of a pen point retracted into a barrel.

With reference to FIGS. 1A through 6B, a retractable writing instrument according to the first embodiment of the present invention is described below. In the embodiments described below, the retractable writing instrument is exemplified by a thermochromic writing instrument that allow handwriting in thermochromic ink to be thermochromic by frictional heat. However, the configuration of the present invention is not limited to a thermochromic writing instrument and is widely applicable to general retractable writing instruments.

1.1 Retractable Writing Instrument

The configuration of a retractable writing instrument 1 according to the first embodiment of the present invention is illustrated in FIGS. 1A, 1B, 2A, and 2B. Double-pointed arrows in these drawings define the "front" and the "rear" of the retractable writing instrument 1. The retractable writing instrument 1 includes a barrel 2, a rotary member 3, a clip 4, a first spring 5, a writing tool body 6, and a friction unit 7.

At first, the external configuration of the retractable writing instrument 1 is described. As illustrated in FIG. 1A, the barrel 2 is configured with a tip 21, a front barrel 22, an intermediate barrel 23, and a rear barrel 24. The front barrel 22 has an outer peripheral surface on which an elastic grip 22*a* is mounted. The rear barrel 24 has an attachment hole 24*b* (refer to FIG. 6A) to fit the friction unit 7. Meanwhile, the clip 4 is configured with a clip body 41, a clip base 43, and a second spring 44 (refer to FIG. 5C). Among the components configuring the appearance of the retractable writing instrument 1, the tip 21 is formed by metal and the other components are formed by a synthetic resin. In the design of the entire retractable writing instrument 1, the tip 21 made of metal markedly differs in the texture and the appearance from the other components made of a synthetic resin and thus is an eye-catching feature to users. A surface of the barrel 2 made of a synthetic resin, for example, a surface of the intermediate barrel 23 is decorated by adhering a transfer film.

Figure 1B:
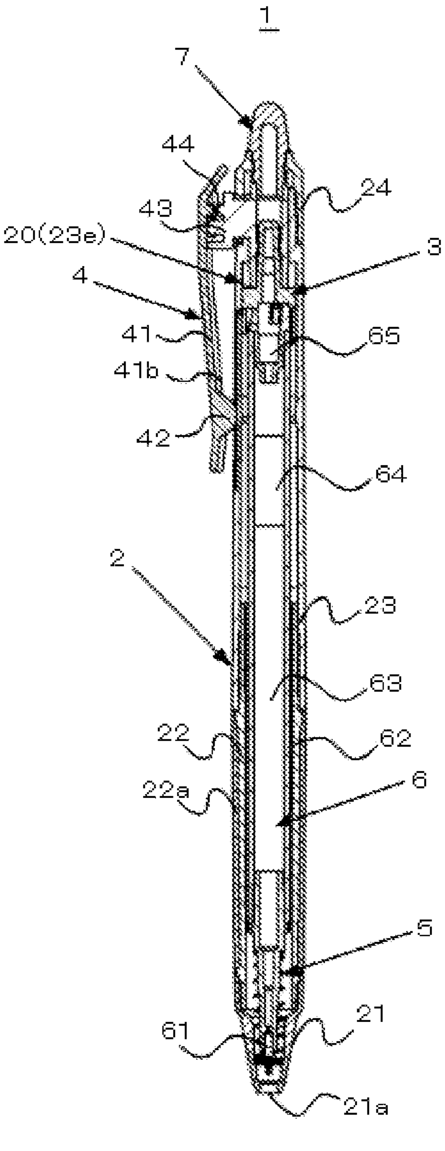
Figure 2A:
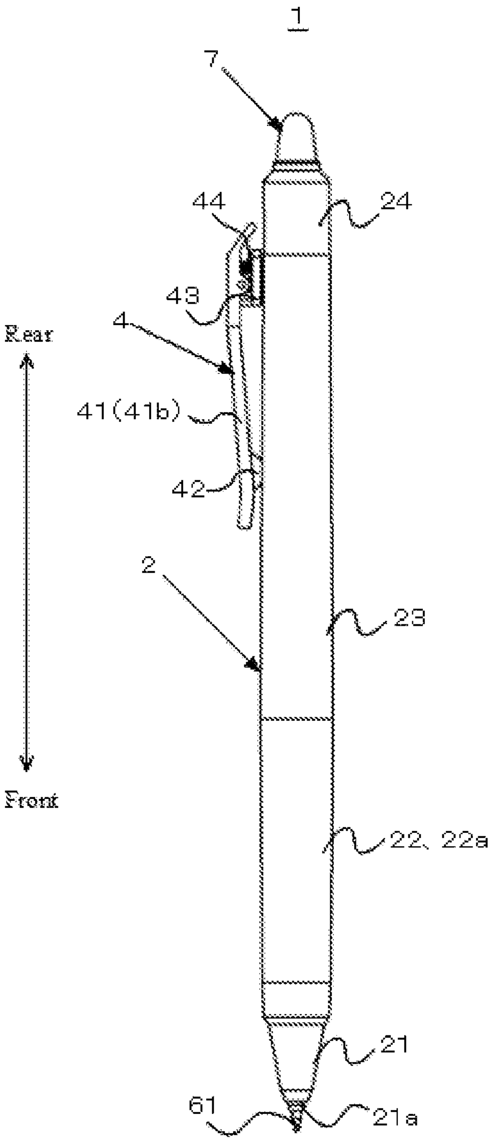
FIGS. 2A and 2B illustrate the retractable writing instrument in a state of the pen point projecting from the barrel.
Figure 2B:
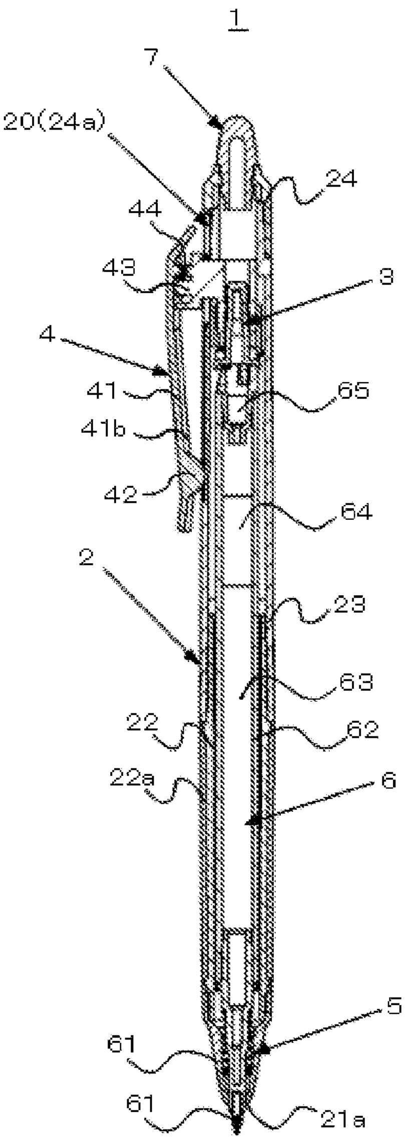
Figure 3A:
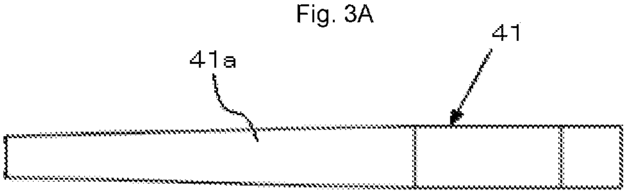
FIGS. 3A through 3F illustrate a clip body configuring a clip of the retractable writing instrument.
Figure 3D:
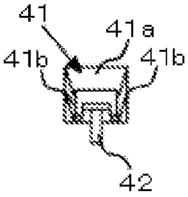
Figure 3B:
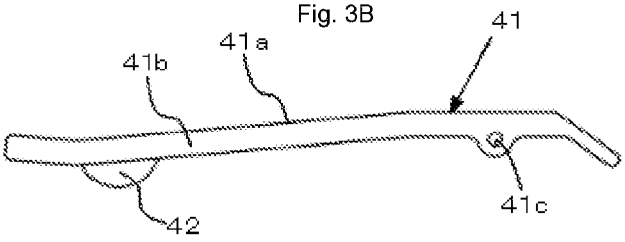
Figure 3E:
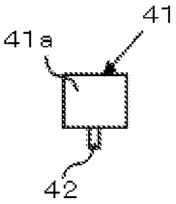
Figure 3C:
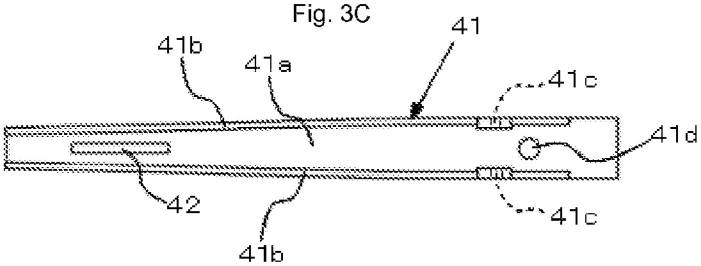
Figure 3F:
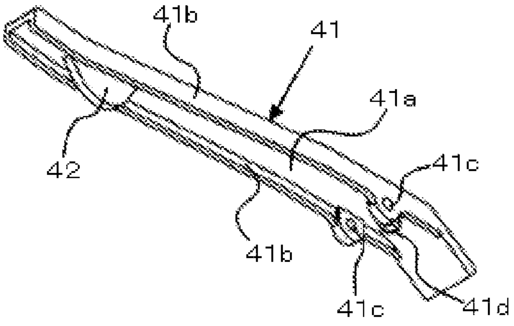
Figure 4A:
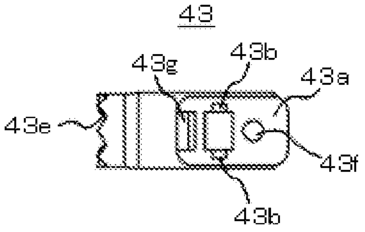
FIGS. 4A through 4F illustrate a clip base configuring the clip of the retractable writing instrument.
Figure 4D:
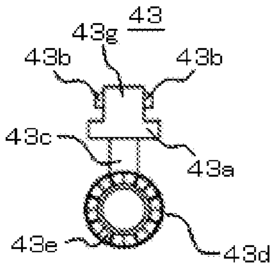
Figure 4B:
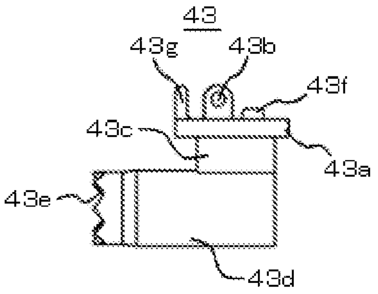
Figure 4E:
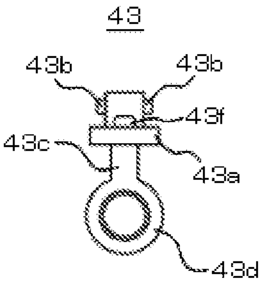
Figure 4C:
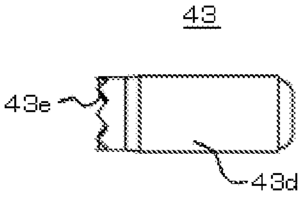
Figure 4F:
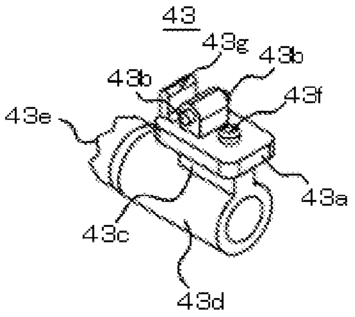

The internal configuration of the retractable writing instrument 1 is then described. As illustrated in FIG. 1B, the barrel 2 houses, in order from the front, the first spring 5, the writing tool body 6, the rotary member 3, and a cylindrical portion 43*d* (refer to FIG. 5C) of the clip base 43.

The writing tool body 6 includes a pen point 61, an ink storage tube 62, thermochromic ink 63, a follower 64, and an end plug 65. The pen point 61 is attached to a front end of the ink storage tube 62. The pen point 61 in the present embodiment is a ball-point pen tip while the configuration of the present invention is not limited to a ball-point pen and is widely applicable to retractable writing instruments, such as mechanical pencils and markers. The thermochromic ink 63 and the follower 64 are filled in the ink storage tube 62. The end plug 65 is mounted in an opening at a rear end of the ink storage tube 62. The end plug 65 is provided with a longitudinally extending air vent at the center. The thermochromic ink 63 forms handwriting on a paper surface and the friction unit 7 allows the handwriting to be thermochromic. The friction unit 7 produces frictional heat by abrasion on a paper surface. The frictional heat causes the handwriting in the thermochromic ink 63 to be thermochromic. The thermochromic ink 63 changes its color by heating, for example, from a first color to a second color or from being colored to being colorless.

A retractable mechanism causes the pen point 61 of the writing tool body 6 to be in a state of projecting from the barrel 2 or a state of being retracted into the barrel 2. The retractable mechanism is configured with the first spring 5, the rotary member 3, and the clip base 43 housed in the barrel 2, a slide hole 20, a cam gear 23*a*, and a cam groove 23*b* provided on a wall of the barrel 2 (refer to FIG. 5C).

As illustrated in FIG. 1B, the first spring 5 is mounted in a front end portion of the writing tool body 6 and constantly biases the writing tool body 6 rearward. Rearward of the writing tool body 6, the rotary member 3 and the clip base 43 are arranged.

Figure 5A:
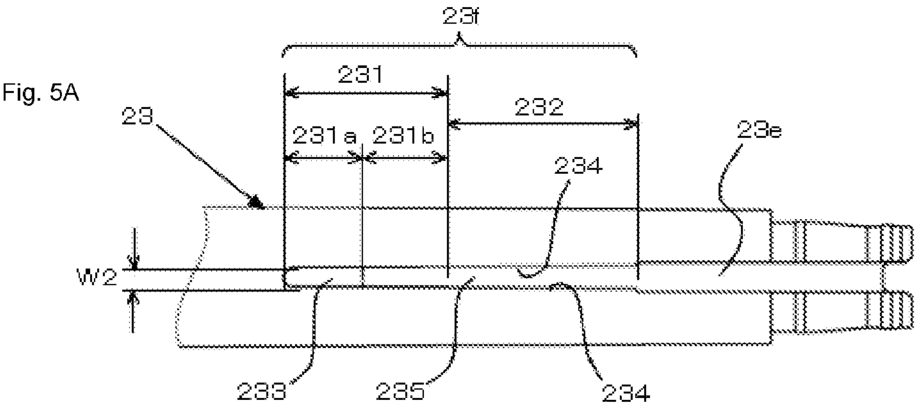
FIGS. 5A, 5B, and 5C illustrate an intermediate barrel configuring the retractable writing instrument.
Figure 5B:
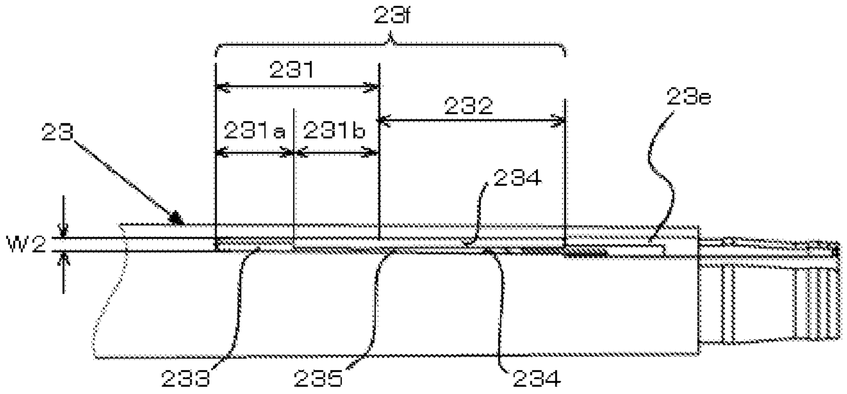
Figure 5C:
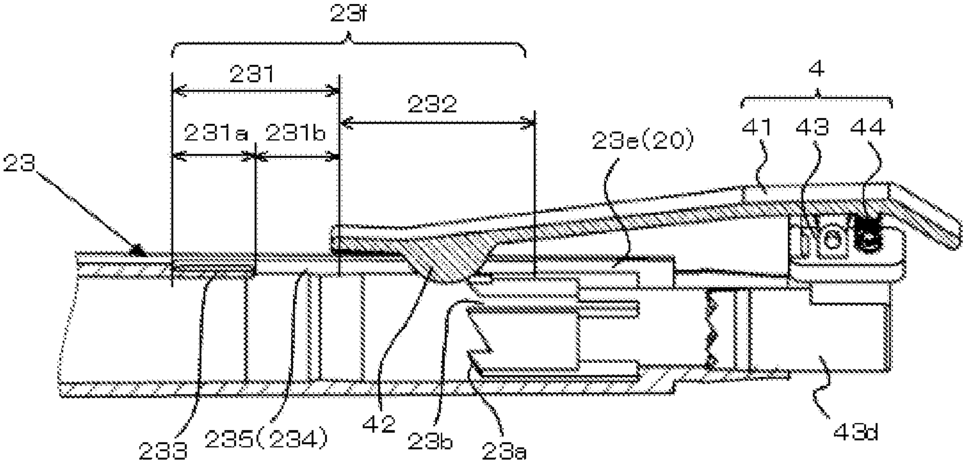

The rotary member 3 is rotatably connected to the cylindrical portion 43*d* of the clip base 43 (refer to FIG. 5C). The rotary member 3 includes four longitudinally extending convex threads 31 (refer to FIG. 6B). The four convex threads 31 are evenly provided on an outer surface of the rotary member 3 at intervals of 90 degrees. The convex threads 31 continue from a side surface to an upper surface of the rotary member 3. Rear end portions of the convex threads 31 projecting from the upper surface of the rotary member 3 form inclined surfaces (cam gear) inclined in one direction.

The clip base 43 is longitudinally slidable along the slide hole 20 provided on a rear side of the barrel 2. The clip base 43 is provided with a slider 43*a*, a coupling portion 43*c*, and the cylindrical portion 43*d* (refer to FIG. 4B). The slider 43*a* is located outside the barrel 2. The cylindrical portion 43*d* is located inside the barrel 2. To the slider 43*a*, a rear side of the clip body 41 is turnably connected. The coupling portion 43*c* couples the slider 43*a* and the cylindrical portion 43*d* via the slide hole 20 of the barrel 2. The cylindrical portion 43*d* is provided with a cam gear 43*e* at a front end (refer to FIG. 4B). The cam gear 43*e* of the cylindrical portion 43*d* engages with the rear end portions of the convex threads 31 of the rotary member 3.

The barrel 2 has an inner wall surface provided with the cam gear 23*a* and the cam groove 23*b* described above (refer to FIG. 5C). The cam gear 23*a* and the cam groove 23*b* alternately engage with the convex threads 31 of the rotary member 3 (refer to FIG. 6B). This causes the pen point 61 of the writing tool body 6 to be in the projected state or the retracted state. That is, a user of the retractable writing instrument 1 slides the slider 43*a* of the clip base 43 together with the clip body 41 forward along the slide hole 20 of the barrel 2. Then, in the barrel 2, the rotary member 3 is pushed by the cylindrical portion 43*d* of the clip base 43 and moves forward more than the cam gear 23*a* and the cam groove 23*b*. In this situation, the rotary member 3 rotates in one direction and the convex threads 31 engage with either one of the cam gear 23*a* or the cam groove 23*b*. The engagement of the convex threads 31 with the cam gear 23*a* causes the rotary member 3 to be retained in the forwardly moved state. As a result, the pen point 61 of the writing tool body 6 is in a state of projecting from a front end hole 21*a* of the barrel 2. In contrast, engagement of the convex threads 31 with the cam groove 23*b* causes rearward movement of the rotary member 3 along the cam groove 23*b*. As a result, the pen point 61 of the writing tool body 6 is in the state of being retracted into the barrel 2.

1.2 Clip

The retractable writing instrument 1 in the present embodiment includes the clip 4 allowing open/close operation. The configuration of the clip 4 is described below in detail. The clip 4 in the present embodiment is made with the clip body 41, the clip base 43, and the second spring 44 illustrated in FIG. 5C. The clip body 41 and the clip base 43 are formed by a synthetic resin. The clip body 41 has a front side formed integrally with the ball portion 42 as a single piece. The rear side of the clip body 41 is turnably connected to the clip base 43 via a hinge. The second spring 44 is placed between the clip body 41 and the clip base 43. By an elastic force of the second spring 44, the rear side of the clip body 41 is pressed in a direction intersecting the barrel 2. This causes the front side of the clip body 41 is biased in a direction of the surface of the barrel 2 (refer to biasing force P2 in FIG. 6A). The clip body 41 may be opened in a direction away from the surface of the barrel 2 by a force greater than the elastic force of the second spring 44. A sandwiched object, such as paper and a notebook, is held between the clip body 41 and the barrel 2.

1.2.1 Clip Body

FIGS. 3A through 3F illustrate the configuration of the clip body 41. The clip body 41 is provided with an upper wall 41*a* extending in a longitudinal direction of the barrel 2. A pair of side walls 41*b* are integrally formed as a single piece on both sides of the upper wall 41*a*. The pair of side walls 41*b* has a length reaching the front of a rear end from a front end of the upper wall 41*a*. The ball portion 42 described above is located on a front side of a back surface of the upper wall 41*a* and projects downward below the pair of side walls 41*b*. On rear sides of the pair of side walls 41*b*, a pair of bearing holes 41*c* are formed. The pair of bearing holes 41*c* configure the hinge described above to allow turning of the clip body 41. Rearward of the bearing holes 41*c* on the back surface of the upper wall 41*a*, a columnar projection 41*d* is integrally formed as a single piece. The projection 41*d* is inserted into an upper portion of the second spring 44 described above to retain the second spring 44.

1.2.2 Clip Base

FIGS. 4A through 4F illustrate the configuration of the clip base 43. As already described, the clip base 43 is provided with the slider 43*a*, the coupling portion 43*c*, and the cylindrical portion 43*d*. The slider 43*a* has a surface formed integrally with a pair of rotating shafts 43*b*, a columnar projection 43*f*, and a stopper 43*g* as a single piece. The pair of rotating shafts 43*b* are inserted into the pair of bearing holes 41*c* of the clip body 41 to configure the hinge described above. The clip body 41 is turnably connected to the clip base 43 with the pair of rotating shafts 43*b* as a fulcrum. The projection 43*f* is inserted into a lower portion of the second spring 44 to retain the second spring 44 described above. The stopper 43*g* is a vertical wall located at a front end of the slider 43*a*. When the pen point is in the retracted state illustrated in FIG. 6B, the stopper 43*g* abuts on a back surface of the clip 4 and blocks the pair of side walls 41*b* of the clip 4 from contacting the surface of the barrel 2 (intermediate barrel 23). At the front end of the cylindrical portion 43*d*, the cam gear 43*e* is provided. The cam gear 43*e* engages with the rear end portions of the convex threads 31 of the rotary member 3.

1.3 Guide Groove of Barrel

FIGS. 5A through 5C illustrate the intermediate barrel 23 configuring the barrel 2. On a rear side of the intermediate barrel 23, the guide groove 23*f* with a narrow width and a first long hole 23*e* with a wide width are provided. The retractable writing instrument 1 in the present embodiment is characterized in the configuration of the guide groove 23*f*. The guide groove 23*f* is a groove extending in the longitudinal direction of the barrel 2 and is configured with a bottom surface 233, a pair of side surfaces 234, and a through groove 235.

Figure 6A:
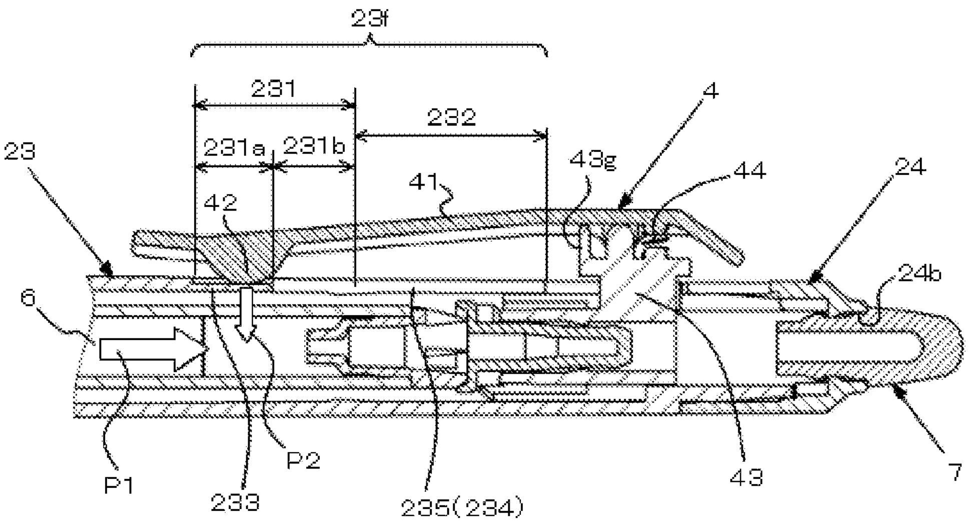
FIGS. 6A and 6B illustrate an internal configuration of the retractable writing instrument.
Figure 6B:
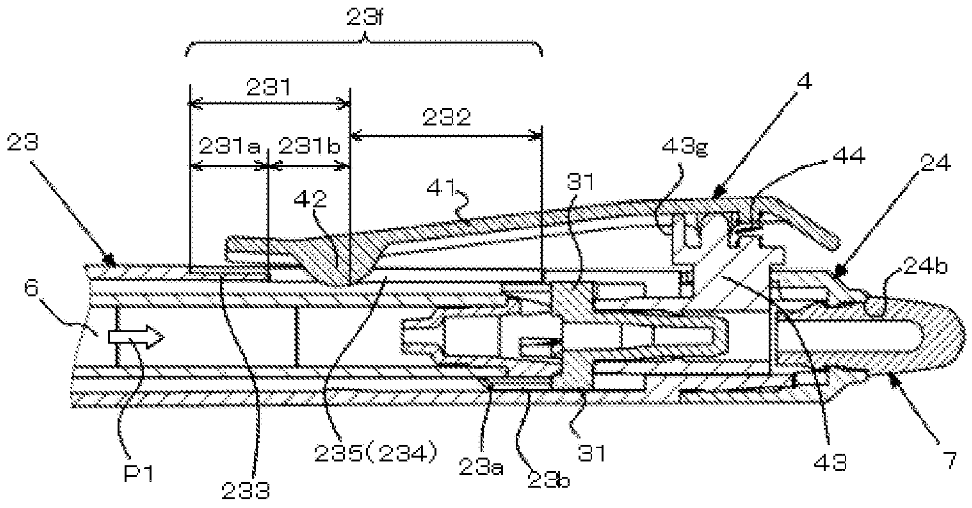

As illustrated in FIG. 6A, the bottom surface 233 of the guide groove 23*f* contacts the ball portion 42 of the clip body 41 when the pen point 61 is in the projected state. The bottom surface 233 receives the biasing force P2 from the clip body 41 by contacting the ball portion 42. Meanwhile, as illustrated in FIG. 6B, when the pen point 61 is in the retracted state, the through groove 235 of the guide groove 23*f* causes the ball portion 42 to be in a noncontact state in the direction of the biasing force P2 illustrated in FIG. 6A. The pair of side surfaces 234 of the guide groove 23*f* restrict lateral movement of the ball portion 42. The guide groove 23*f* thus configured guides the clip 4 being slid to retract and project the pen point 61 in the longitudinal direction of the barrel 2 and moves the clip 4 straight. As already described, the surface of the intermediate barrel 23 is decorated by adhering the transfer film while the transfer film is not adhered to the guide groove 23*f*.

As illustrated in FIGS. 5A and 5B, the guide groove 23*f* in the present embodiment has the entire length more than a length for sliding of the clip 4. The guide groove 23*f* includes a first region 231 on the front side and a second region 232 on the rear side. The second region 232 is in communication with a front end of the first long hole 23*e* provided on the rear side of the intermediate barrel 23. The first long hole 23*e*, together with a second long hole 24*a* in the rear barrel 24 illustrated in FIG. 2B, configures the slide hole 20.

The first region 231 of the guide groove 23*f* is used for sliding the clip 4 to retract and project the pen point 61. That is, when the pen point 61 is retracted and projected, the ball portion 42 of the clip body 41 longitudinally moves in the range of a length of the first region 231.

Meanwhile, the second region 232 of the guide groove 23*f* is used for assembling the clip 4 to the intermediate barrel 23. As illustrated in FIG. 5C, the clip 4 is assembled by inserting the cylindrical portion 43*d* of the clip base 43 into the intermediate barrel 23. In the process of assembling the clip 4 to the intermediate barrel 23, the ball portion 42 of the clip body 41 passes through the first long hole 23*e* and is guided from the second region 232 of the guide groove 23*f* to the first region 231. This allows the clip 4 to be assembled to the intermediate barrel 23 without causing the ball portion 42 to contact the surface of the intermediate barrel 23 with a transfer film adhered thereto.

In this situation, the bottom surface 233 of the guide groove 23*f* is not an essential configuration but is formed in an area other than a rear half portion 231*b* of the first region 231 in the guide groove 23*f*. The bottom surface 233 is preferably formed in a front half portion 231*a* of the first region 231 as in the present embodiment. In this case, the bottom surface 233 has substantially the same length as that of the front half portion 231*a*. The bottom surface 233 in the present embodiment has a length slightly shorter than the entire length of the front half portion 231*a* of the first region 231. That is, as illustrated in FIG. 6A, the bottom surface 233 has a minimum length capable of contacting the ball portion 42 of the clip body 41 when the pen point 61 is in the projected state.

The through groove 235 of the guide groove 23*f* is formed at least in the rear half portion 231*b* of the first region 231. The through groove 235 in the present embodiment is formed across the entire area from the first region 231 to the second region 232 excluding the bottom surface 233 and continues to the first long hole 23*e*.

1.4 Technical Effects of Guide Groove

In the projected state of the pen point 61 illustrated in FIG. 6A, the ball portion 42 of the clip body 41 is located in the front half portion 231*a* of the first region 231 of the guide groove 23*f*. The ball portion 42 is pressed against the bottom surface 233 of the guide groove 23*f* by the biasing force P2 of the clip body 41. As a result, frictional resistance is produced between the ball portion 42 and the bottom surface 233. The biasing force P2 of the clip body 41 and the frictional resistance of the ball portion 42 exhibit a preferred effect of inhibiting a rattle of the clip 4. That is, the bottom surface 233 formed in the front half portion 231*a* of the first region 231 of the guide groove 23*f* prevents a rattle of the clip 4 in the projected state of the pen point Then, the projected state of the pen point 61 illustrated in FIG. 6A is transferred to the retracted state of the pen point 61 illustrated in FIG. 6B by sliding the clip 4 forward of the barrel 2 (refer to FIG. 2A). In the process of transfer of the pen point 61 from the projected state to the retracted state, the clip 4 is slid rearward of the barrel 2 by the elastic force P1 of the first spring 5 (refer to FIGS. 1B and 2B) mounted in the front end portion of the writing tool body 6.

In the process of transfer of the pen point 61 from the projected state to the retracted state, the ball portion 42 of the clip body 41 fits into the through groove 235 from above the bottom surface 233 in a position passing through the boundary between the front half portion 231*a* and the rear half portion 231*b* in the first region 231 of the guide groove 23*f*. After that, the ball portion 42 moves to the boundary between the second region 232 and the rear half portion 231*b* of the first region 231 along the through groove 235. This causes the pen point 61 to be in the completely retracted state illustrated in FIG. 6B.

Meanwhile, the elastic force P1 of the first spring 5 biasing the writing tool body 6 rearward (refer to FIGS. 1B and 2B) is maximum in the projected state of the pen point illustrated in FIG. 6A and minimum in the retracted state of the pen point illustrated in FIG. 6B.

As illustrated in FIG. 6B, formation of the through groove 235 in the guide groove 23*f* causes the ball portion 42 to be in the noncontact state in the direction of the biasing force P2 illustrated in FIG. 6A during transfer of the pen point 61 from the projected state to the retracted state. This causes the biasing force P2 of the clip body 41 and the frictional resistance of the ball portion 42 to be zero. Accordingly, the guide groove 23*f* in the present embodiment prevents the rearward movement of the clip 4 from being stopped immediately before the pen point 61 is in the completely retracted state illustrated in FIG. 6B even if the elastic force P1 of the first spring 5 is reduced. That is, in the retractable writing instrument according to the present embodiment, normal movement of the clip 4 is securely performed to cause the pen point 61 to be in the retracted state.

As illustrated in FIG. 5C, the through groove 235 formed in the second region 232 of the guide groove 23*f* is used when the clip 4 is assembled to the intermediate barrel 23. In the process of assembling the clip 4 to the intermediate barrel 23, the ball portion 42 of the clip body 41 passes through the first long hole 23*e* and is guided to the first region 231 by the through groove 235 formed in the second region 232 of the guide groove 23*f*. This allows the clip 4 to be assembled to the intermediate barrel 23 without causing the ball portion 42 to contact the surface of the intermediate barrel 23 with a transfer film adhered thereto.

2. Second Embodiment

With reference to FIGS. 7A through 8B, a retractable writing instrument according to the second embodiment of the present invention is then described. The retractable writing instrument according to the second embodiment is characterized in the configuration of the guide groove 23*f* illustrated in FIGS. 7A through 8B and has the other configurations same as those in the first embodiment described above. Accordingly, in the second embodiment below, identical reference signs are given to the same configurations as those in the first embodiment described above to omit detailed descriptions.

Figure 7A:
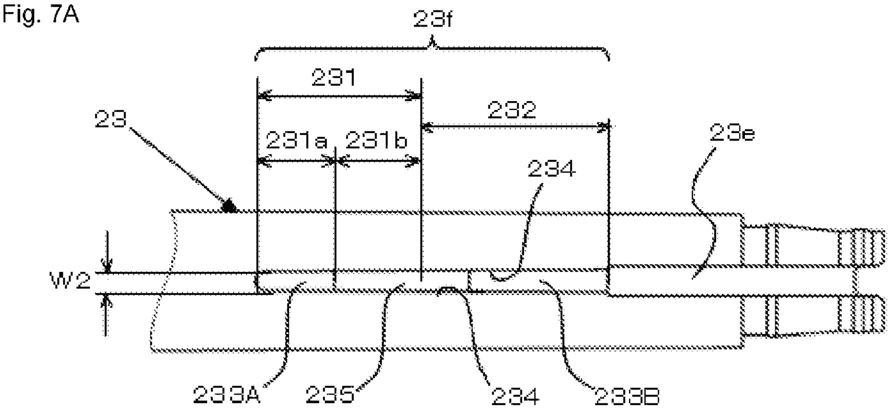
FIGS. 7A, 7B, and 7C illustrate an intermediate barrel configuring a retractable writing instrument according to a second embodiment of the present invention.
Figure 7B:
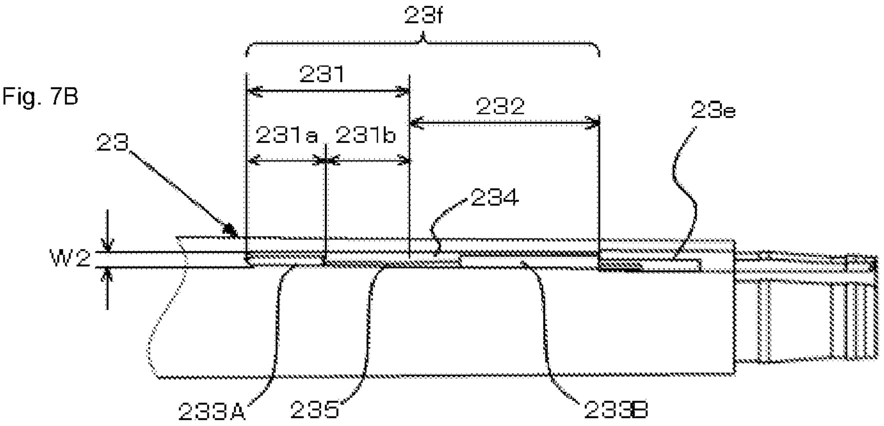
Figure 7C:
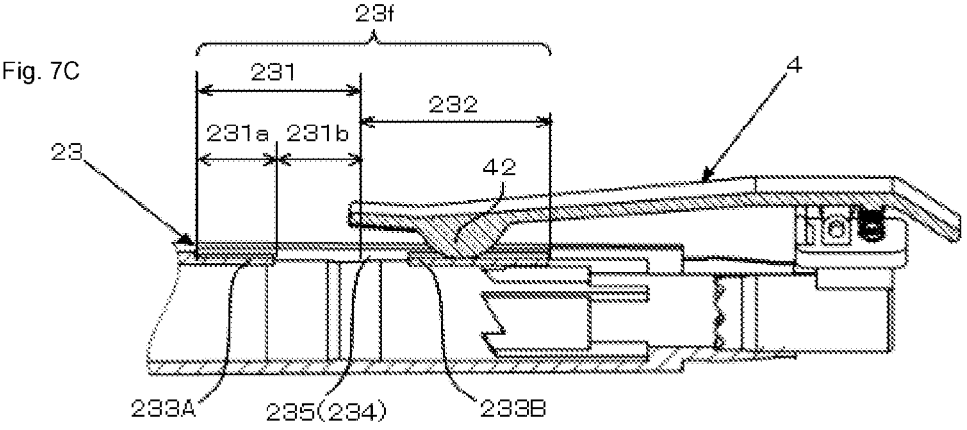

FIGS. 7A, 7B, and 7C illustrate an intermediate barrel 23 of the retractable writing instrument according to the second embodiment. A guide groove 23*f* of the retractable writing instrument according to the second embodiment has a first bottom surface 233A, a through groove 235, and a second bottom surface 233B. Similar to the first embodiment described above, the first bottom surface 233A is formed in the front half portion 231*a* of the first region 231. The second bottom surface 233B is formed in the second region 232. The through groove 235 is formed between the first bottom surface 233A and the second bottom surface 233B. The through groove 235 in the present embodiment has a length from a rear end of the first bottom surface 233A, through the boundary between the first region 231 and the second region 232, reaching a front end of the second bottom surface 233B. The guide groove 23*f* in the present embodiment also exhibits technical effects similar to those in the first embodiment described above.

Figure 8A:
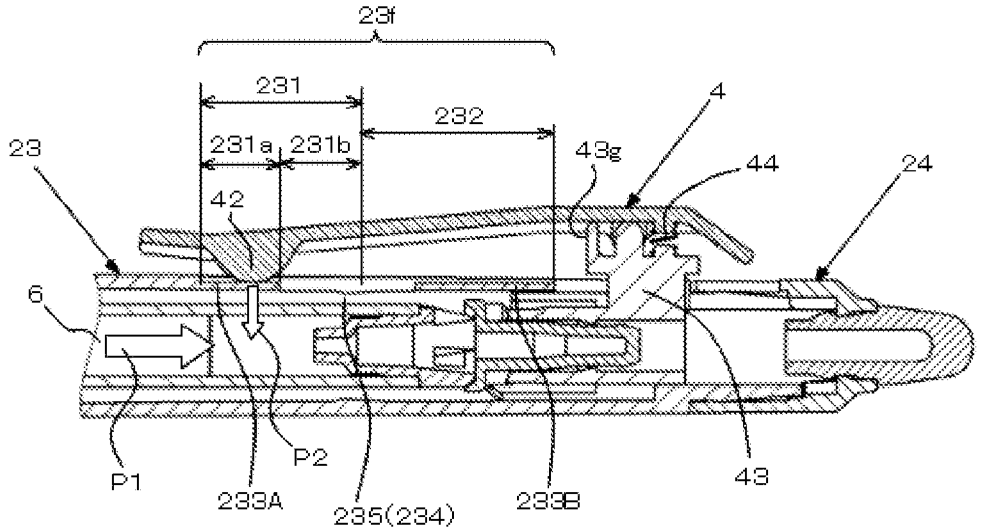
FIGS. 8A and 8B illustrate an internal configuration of the retractable writing instrument in the second embodiment.

That is, in the projected state of the pen point 61 illustrated in FIG. 8A, the ball portion 42 of the clip body 41 is located in the front half portion 231*a* of the first region 231 of the guide groove 23*f*. The ball portion 42 is pressed against the first bottom surface 233A of the guide groove 23*f* by the biasing force P2 of the clip body 41. As a result, frictional resistance is produced between the ball portion 42 and the first bottom surface 233A. The biasing force P2 of the clip body 41 and the frictional resistance of the ball portion 42 exhibit a preferred effect of inhibiting a rattle of the clip 4. That is, the first bottom surface 233A formed in the front half portion 231*a* of the first region 231 of the guide groove 23*f* prevents a rattle of the clip 4 in the projected state of the pen point 61.

In the process of transfer of the pen point 61 from the projected state to the retracted state, the ball portion 42 of the clip body 41 fits into the through groove 235 from above the first bottom surface 233A in a position passing through the boundary between the front half portion 231*a* and the rear half portion 231*b* in the first region 231 of the guide groove 23*f*. After that, the ball portion 42 moves to the boundary between the second region 232 and the rear half portion 231*b* of the first region 231 along the through groove 235. This allows the pen point 61 to be in the completely retracted state illustrated in FIG. 8B.

Figure 8B:
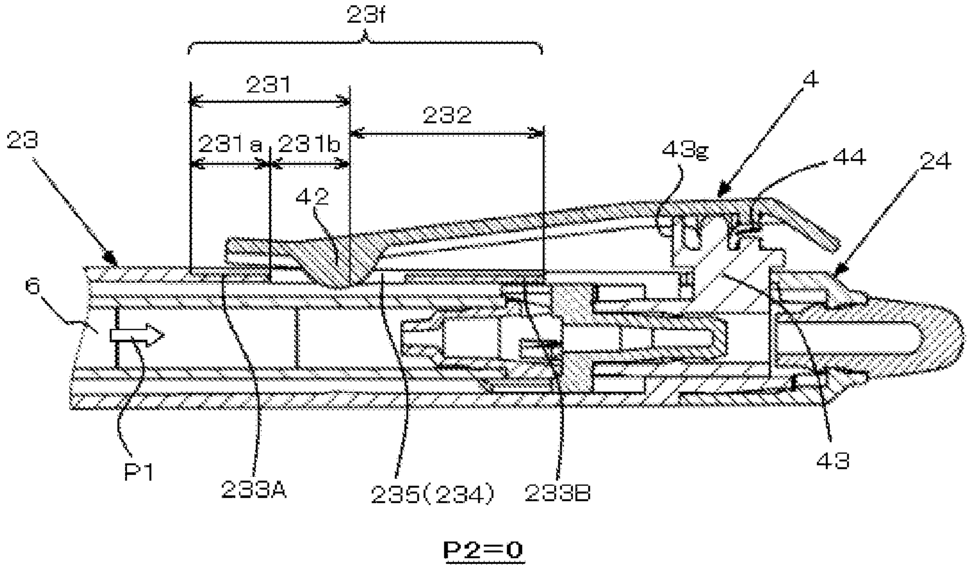

As illustrated in FIG. 8B, formation of the through groove 235 in the guide groove 23*f* causes the ball portion 42 to be in the noncontact state in the direction of the biasing force P2 illustrated in FIG. 8A during transfer of the pen point 61 from the projected state to the retracted state. This causes the biasing force P2 of the clip body 41 and the frictional resistance of the ball portion 42 to be zero. Accordingly, the guide groove 23*f* in the present embodiment prevents the rearward movement of the clip 4 from being stopped immediately before the pen point 61 is in the completely retracted state illustrated in FIG. 8B even if the elastic force P1 of the first spring 5 is reduced. That is, in the retractable writing instrument according to the present embodiment, normal movement of the clip 4 is securely performed to cause the pen point 61 to be in the retracted state.

As illustrated in FIG. 7C, the second region 232 of the guide groove 23*f* is used when the clip 4 is assembled to the intermediate barrel 23. In the process of assembling the clip 4 to the intermediate barrel 23, the ball portion 42 of the clip body 41 passes through the first long hole 23*e* and is guided to the first region 231 by the second region 232 of the guide groove 23*f*. This allows the clip 4 to be assembled to the intermediate barrel 23 without causing the ball portion 42 to contact the surface of the intermediate barrel 23 with a transfer film adhered thereto.

Moreover, formation of the second bottom surface 233B in the second region 232 of the guide groove 23*f* improves the rigidity of the rear side portion of the intermediate barrel 23. That is, in the rear side portion of the intermediate barrel 23, the through groove 235 and the first long hole 23*e* are formed. As illustrated in FIG. 5A, continuation of the through groove 235 and the first long hole 23*e* causes the rear side portion of the intermediate barrel 23 to have reduced rigidity and readily deflect. The second bottom surface 233B illustrated in FIG. 7A breaks the continuation of the through groove 235 and the first long hole 23*e* to improve the rigidity of the rear side portion of the intermediate barrel 23. This causes the rear side portion of the intermediate barrel 23 to be less likely to deflect and allows a transfer film to be efficiently adhered to the surface of the intermediate barrel 23.

3. Third Embodiment

Figure 9A:
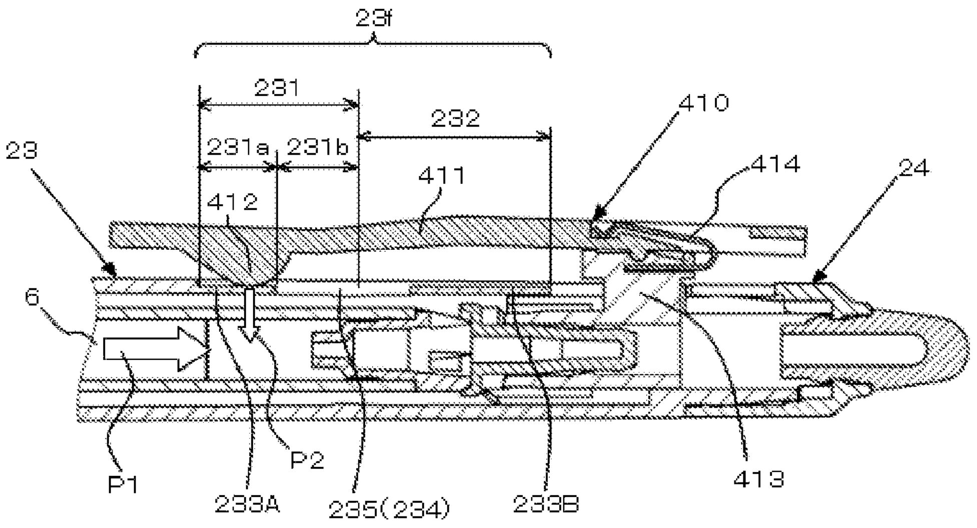
FIGS. 9A and 9B illustrate an internal configuration of a retractable writing instrument according to a third embodiment of the present invention.
Figure 9B:
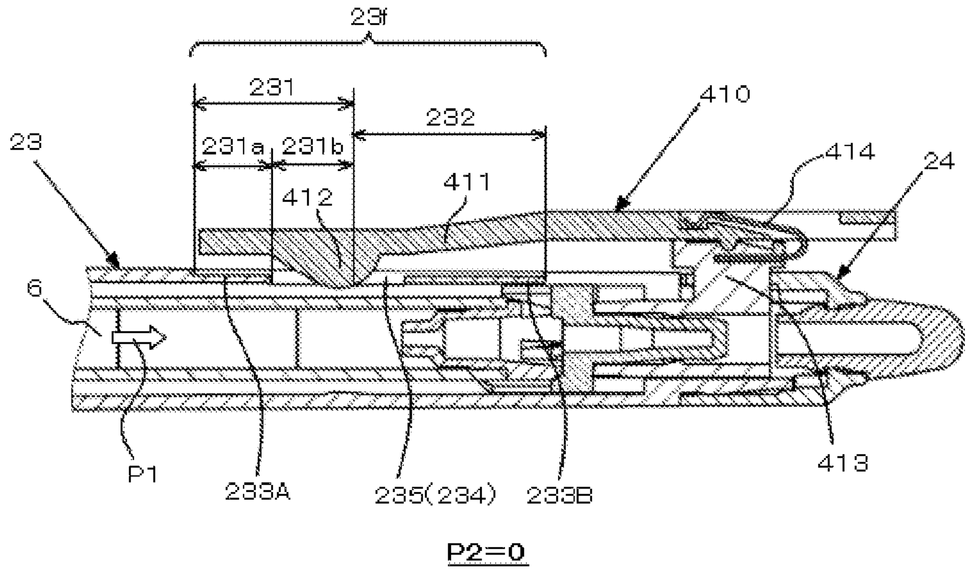

With reference to FIGS. 9A and 9B, a retractable writing instrument according to the third embodiment of the present invention is then described. The retractable writing instrument according to the third embodiment is characterized in the configuration of a clip 410 illustrated in FIGS. 9A and 9B and has the other configurations same as those in the first or second embodiment described above. Accordingly, in the third embodiment below, identical reference signs are given to the same configurations as those in the first or second embodiment described above to omit detailed descriptions.

FIGS. 9A and 9B illustrate the internal configuration of the retractable writing instrument in the third embodiment. FIG. 9A illustrates the projected state of the pen point 61 and FIG. 9B illustrates the retracted state of the pen point 61. The clip 410 in the present embodiment is made with a clip body 411, a clip base 413, and a leaf spring 414. The clip body 411 and the clip base 413 are formed by a synthetic resin. On a front side of the clip body 411, a ball portion 412 is integrally formed as a single piece. A rear side of the clip body 411 is openably connected to the clip base 413 by the U-shaped leaf spring 414. The rear side of the clip body 411 is pressed against a surface of the clip base 413 by elastic force of the leaf spring 414. This causes the front side of the clip body 411 to be biased in the direction of the surface of the barrel 2 (refer to the biasing force P2 in FIG. 9A). The clip body 411 may be opened in a direction away from the surface of the barrel 2 by a force greater than the elastic force of the leaf spring 414. A sandwiched object, such as paper and a notebook, is held between the clip body 411 and the barrel 2.

In this situation, the clip base 413 in the present embodiment supports the clip body 411 at a predetermined height. Specifically, the clip base 413 supports the clip body 411 at a height to cause the clip body 411 not to contact the surface of the barrel 2 in the retracted state of the pen point 61 illustrated in FIG. 9B. This causes the surface of the barrel 2 not to be damaged.

In the projected state of the pen point 61 illustrated in FIG. 9A, the ball portion 412 of the clip body 411 is located in the front half portion 231*a* of the first region 231 of the guide groove 23*f*. The ball portion 412 is pressed against the first bottom surface 233A of the guide groove 23*f* by the biasing force P2 of the clip body 411. As a result, frictional resistance is produced between the ball portion 412 and the first bottom surface 233A. The biasing force P2 of the clip body 411 and the frictional resistance of the ball portion 412 exhibit a preferred effect of inhibiting a rattle of the clip 410. That is, the first bottom surface 233A formed in the front half portion 231*a* of the first region 231 of the guide groove 23*f* prevents a rattle of the clip 410 in the projected state of the pen point 61.

In the process of transfer of the pen point 61 from the projected state to the retracted state, the ball portion 412 of the clip body 411 fits into the through groove 235 from above the first bottom surface 233A in a position passing through the boundary between the front half portion 231*a* and the rear half portion 231*b* in the first region 231 of the guide groove 23*f*. After that, the ball portion 412 moves to the boundary between the second region 232 and the rear half portion 231*b* of the first region 231 along the through groove 235. This allows the pen point 61 to be in the completely retracted state illustrated in FIG. 9B.

As illustrated in FIG. 9B, formation of the through groove 235 in the guide groove 23*f* causes the ball portion 412 to be in the noncontact state in the direction of the biasing force P2 illustrated in FIG. 9A during transfer of the pen point 61 from the projected state to the retracted state. This causes the biasing force P2 of the clip body 411 and the frictional resistance of the ball portion 412 to be zero. Accordingly, the guide groove 23*f* in the present embodiment prevents the rearward movement of the clip 410 from being stopped immediately before the pen point 61 is in the completely retracted state illustrated in FIG. 9B even if the elastic force P1 of the first spring 5 is reduced. That is, in the retractable writing instrument according to the present embodiment, normal movement of the clip 410 is securely performed to cause the pen point 61 to be in the retracted state.

4. Fourth Embodiment

Figure 10A:
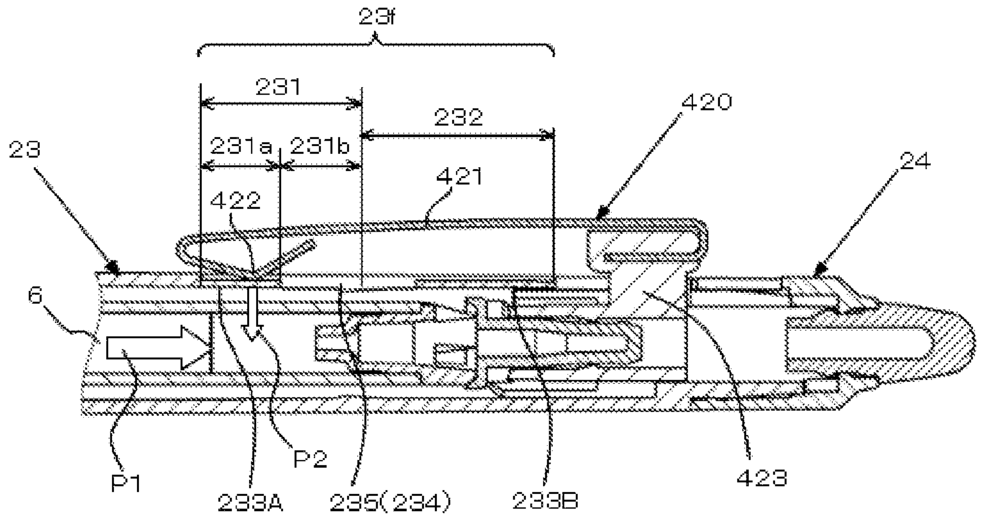
FIGS. 10A and 10B illustrate an internal configuration of a retractable writing instrument according to a fourth embodiment of the present invention.
Figure 10B:
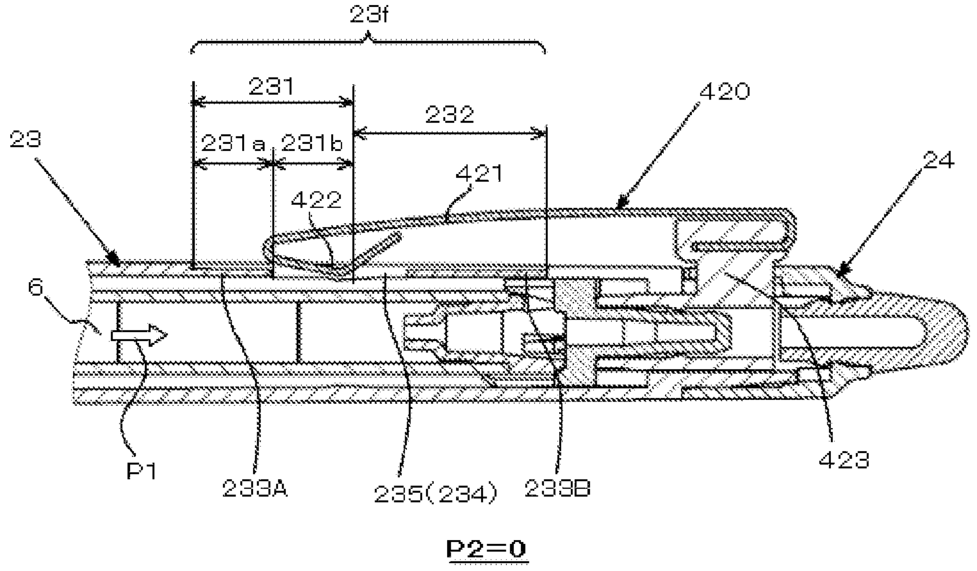

With reference to FIGS. 10A and 10B, a retractable writing instrument according to the fourth embodiment of the present invention is then described. The retractable writing instrument according to the fourth embodiment is characterized in the configuration of a clip 420 illustrated in FIGS. 10A and 10B and has the other configurations same as those in the first or second embodiment described above. Accordingly, in the fourth embodiment below, identical reference signs are given to the same configurations as those in the first or second embodiment described above to omit detailed descriptions.

FIGS. 10A and 10B illustrate the internal configuration of the retractable writing instrument in the fourth embodiment. FIG. 10A illustrates the projected state of the pen point 61 and FIG. 10B illustrates the retracted state of the pen point 61. The clip 420 in the present embodiment is made with a clip body 421 and a clip base 423. The clip body 421 is configured with sheet metal extending in the longitudinal direction of the barrel 2. On a front side of the clip body 421, a ball portion 422 is integrally formed as a single piece by bending the sheet metal. A rear side of the clip body 421 is connected to the clip base 423. The clip body 421 produces a biasing force P2 in the direction of the surface of the barrel 2 by the elasticity of its own.

The clip base 423 supports the clip body 421 at a predetermined height. Specifically, the clip base 423 supports the clip body 421 at a height to cause the clip body 421 not to contact the surface of the barrel 2 in the retracted state of the pen point 61 illustrated in FIG. 10B. This causes the surface of the barrel 2 not to be damaged.

In the projected state of the pen point 61 illustrated in FIG. 10A, the ball portion 422 of the clip body 421 is located in the front half portion 231*a* of the first region 231 of the guide groove 23*f*. The ball portion 422 is pressed against the first bottom surface 233A of the guide groove 23*f* by the biasing force P2 of the clip body 421. As a result, frictional resistance is produced between the ball portion 422 and the first bottom surface 233A. The biasing force P2 of the clip body 421 and the frictional resistance of the ball portion 422 exhibit a preferred effect of inhibiting a rattle of the clip 420. That is, the first bottom surface 233A formed in the front half portion 231*a* of the first region 231 of the guide groove 23*f* prevents a rattle of the clip 420 in the projected state of the pen point 61.

In the process of transfer of the pen point 61 from the projected state to the retracted state, the ball portion 422 of the clip body 421 fits into the through groove 235 from above the first bottom surface 233A in a position passing through the boundary between the front half portion 231*a* and the rear half portion 231*b* in the first region 231 of the guide groove 23*f*. After that, the ball portion 422 moves to the boundary between the second region 232 and the rear half portion 231*b* of the first region 231 along the through groove 235. This allows the pen point 61 to be in the completely retracted state illustrated in FIG. 10B.

As illustrated in FIG. 10B, formation of the through groove 235 in the guide groove 23*f* causes the ball portion 422 to be in the noncontact state in the direction of the biasing force P2 illustrated in FIG. 10A during transfer of the pen point 61 from the projected state to the retracted state. This causes the biasing force P2 of the clip body 421 and the frictional resistance of the ball portion 422 to be zero. Accordingly, the guide groove 23*f* in the present embodiment prevents the rearward movement of the clip 420 from being stopped immediately before the pen point 61 is in the completely retracted state illustrated in FIG. 10B even if the elastic force P1 of the first spring 5 is reduced. That is, in the retractable writing instrument according to the present embodiment, normal movement of the clip 420 is securely performed to cause the pen point 61 to be in the retracted state.

5. Fifth Embodiment

Figure 11A:
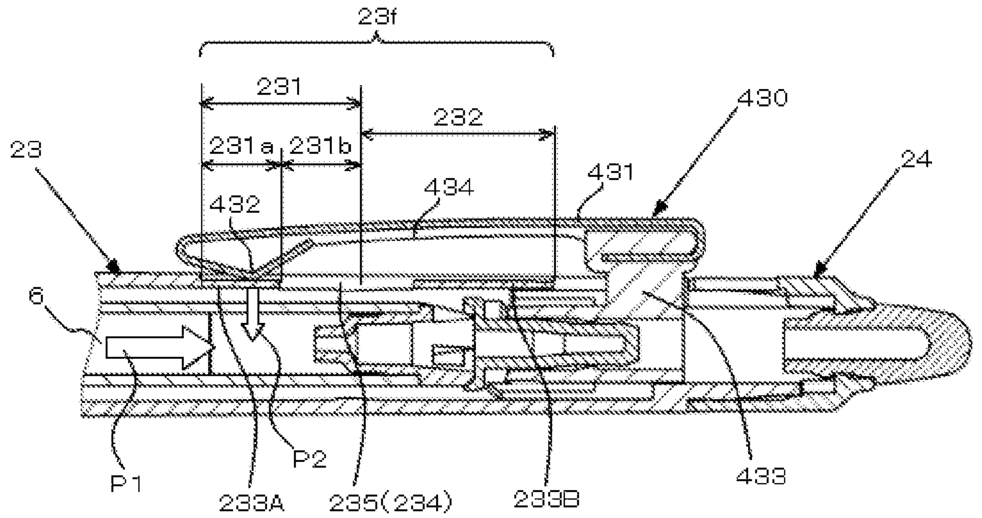
FIGS. 11A and 11B illustrate an internal configuration of a retractable writing instrument according to a fifth embodiment of the present invention.
Figure 11B:
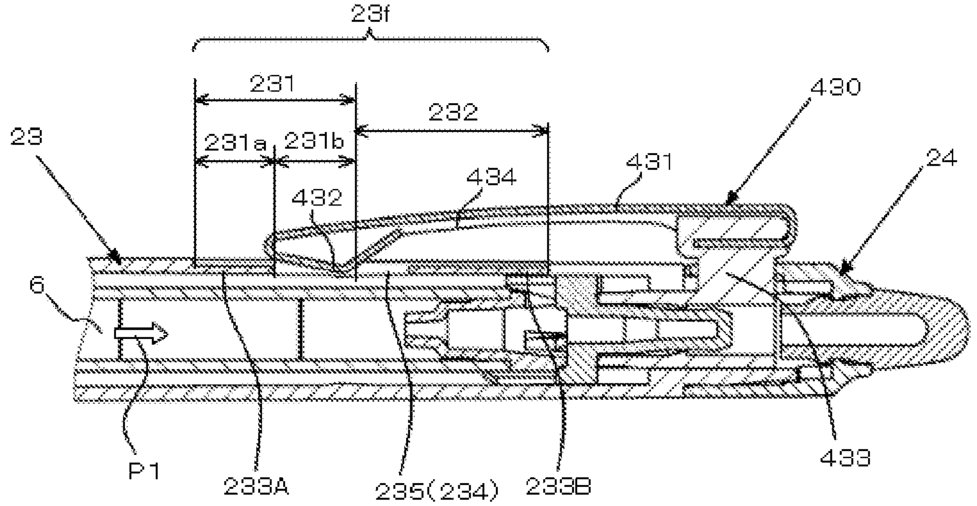

With reference to FIGS. 11A and 11B, a retractable writing instrument according to the fifth embodiment of the present invention is then described. The retractable writing instrument according to the fifth embodiment is characterized in the configuration of a clip 430 illustrated in FIGS. 11A and 11B and has the other configurations same as those in the first or second embodiment described above. Accordingly, in the fifth embodiment below, identical reference signs are given to the same configurations as those in the first or second embodiment described above to omit detailed descriptions.

FIGS. 11A and 11B illustrate the internal configuration of the retractable writing instrument in the fifth embodiment. FIG. 11A illustrates the projected state of the pen point 61 and FIG. 11B illustrates the retracted state of the pen point 61. The clip 430 in the present embodiment is made with a clip body 431 and a clip base 433. The clip body 431 is configured by bending sheet metal, in a box shape, that extends in the longitudinal direction of the barrel 2. On a front side of the clip body 431, a ball portion 432 is integrally provided as a single piece by bending the sheet metal. On both sides of the clip body 431, a pair of side walls 434 are integrally provided as a single piece by bending the sheet metal. A rear side of the clip body 431 is connected to the clip base 433. The clip body 431 produces a biasing force P2 in the direction of the surface of the barrel 2 by the elasticity of its own.

The clip base 433 supports the clip body 431 at a predetermined height. Specifically, the clip base 433 supports the clip body 431 at a height to cause the pair of side walls 434 of the clip body 431 not to contact the surface of the barrel 2 in the retracted state of the pen point 61 illustrated in FIG. 11B. This causes the surface of the barrel 2 not to be damaged.

In the projected state of the pen point 61 illustrated in FIG. 11A, the ball portion 432 of the clip body 431 is located in the front half portion 231*a* of the first region 231 of the guide groove 23*f*. The ball portion 432 is pressed against the first bottom surface 233A of the guide groove 23*f* by the biasing force P2 of the clip body 431. As a result, frictional resistance is produced between the ball portion 432 and the first bottom surface 233A. The biasing force P2 of the clip body 431 and the frictional resistance of the ball portion 432 exhibit a preferred effect of inhibiting a rattle of the clip 430. That is, the first bottom surface 233A formed in the front half portion 231*a* of the first region 231 of the guide groove 23*f* prevents a rattle of the clip 430 in the projected state of the pen point 61.

In the process of transfer of the pen point 61 from the projected state to the retracted state, the ball portion 432 of the clip body 431 fits into the through groove 235 from above the first bottom surface 233A in a position passing through the boundary between the front half portion 231*a* and the rear half portion 231*b* in the first region 231 of the guide groove 23*f*. After that, the ball portion 432 moves to the boundary between the second region 232 and the rear half portion 231*b* of the first region 231 along the through groove 235. This allows the pen point 61 to be in the completely retracted state illustrated in FIG. 11B.

As illustrated in FIG. 11B, formation of the through groove 235 in the guide groove 23*f* causes the ball portion 432 to be in the noncontact state in the direction of the biasing force P2 illustrated in FIG. 11A during transfer of the pen point 61 from the projected state to the retracted state. This causes the biasing force P2 of the clip body 431 and the frictional resistance of the ball portion 432 to be zero. Accordingly, the guide groove 23*f* in the present embodiment prevents the rearward movement of the clip 430 from being stopped immediately before the pen point 61 is in the completely retracted state illustrated in FIG. 11B even if the elastic force P1 of the first spring 5 is reduced. That is, in the retractable writing instrument according to the present embodiment, normal movement of the clip 430 is securely performed to cause the pen point 61 to be in the retracted state.

6. Sixth Embodiment

Figure 12A:
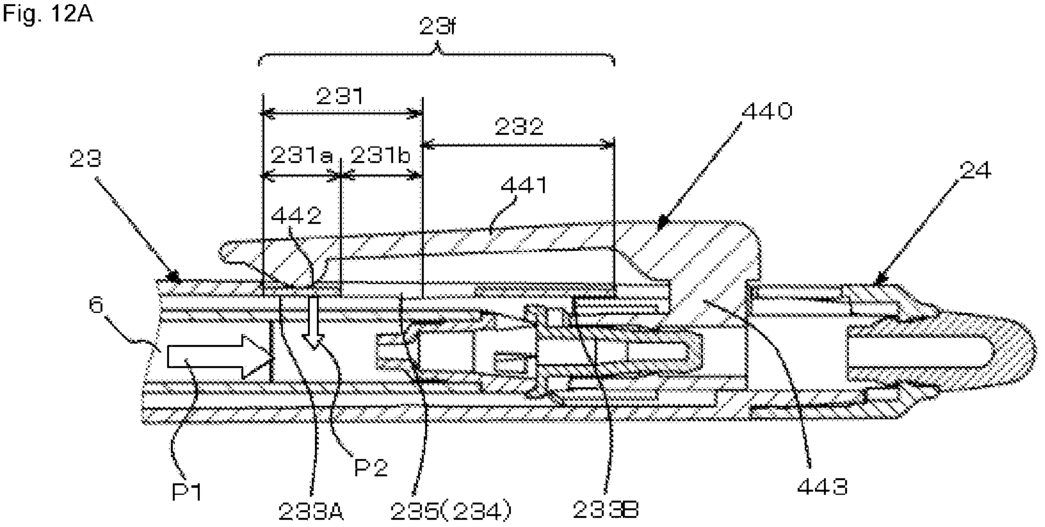
FIGS. 12A, 12B, and 12C illustrate an internal configuration of a retractable writing instrument according to a sixth embodiment of the present invention.
Figure 12B:
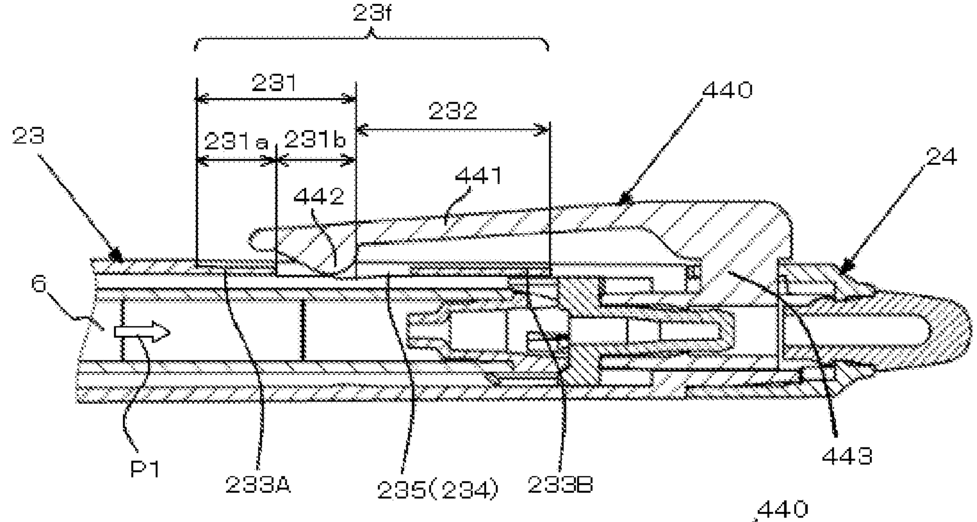
Figure 12C:
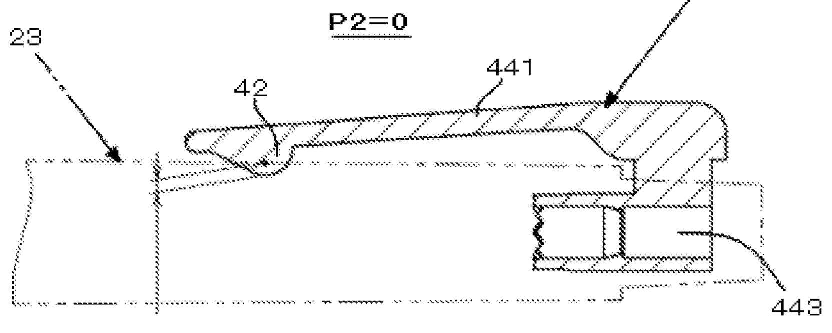

With reference to FIGS. 12A, 12B, and 12C, a retractable writing instrument according to the sixth embodiment of the present invention is then described. The retractable writing instrument according to the sixth embodiment is characterized in the configuration of a clip 440 illustrated in FIGS. 12A, 12B, and 12C and has the other configurations same as those in the first or second embodiment described above. Accordingly, in the sixth embodiment below, identical reference signs are given to the same configurations as those in the first or second embodiment described above to omit detailed descriptions.

FIGS. 12A, 12B, and 12C illustrate the internal configuration of the retractable writing instrument in the sixth embodiment. FIG. 12A illustrates the projected state of the pen point 61 and FIG. 12B illustrates the retracted state of the pen point 61. FIG. 12C illustrates the positional relationship between a ball portion 442 of a clip body 441 and the surface of the barrel 2.

The clip 440 in the present embodiment has a configuration integrally formed of the clip body 441, the ball portion 442, and a clip base 443 by a synthetic resin as a single piece. As illustrated in FIG. 12C, the clip body 441 is inclined at an angle to locate the ball portion 442 inward of the surface of the barrel 2 (intermediate barrel 23). This causes the clip body 441 to produce a biasing force P2 in the direction of the surface of the barrel 2 by the elasticity of its own.

The clip base 443 supports the clip body 441 at a predetermined height. Specifically, the clip base 443 supports the clip body 441 at a height to cause the clip body 441 not to contact the surface of the barrel 2 in the retracted state of the pen point 61 illustrated in FIG. 12B. This causes the surface of the barrel 2 not to be damaged.

In the projected state of the pen point 61 illustrated in FIG. 12A, the ball portion 442 of the clip body 441 is located in the front half portion 231*a* of the first region 231 of the guide groove 23*f*. The ball portion 442 is pressed against the first bottom surface 233A of the guide groove 23*f* by the biasing force P2 of the clip body 441. As a result, frictional resistance is produced between the ball portion 442 and the first bottom surface 233A. The biasing force P2 of the clip body 441 and the frictional resistance of the ball portion 442 exhibit a preferred effect of inhibiting a rattle of the clip 440. That is, the first bottom surface 233A formed in the front half portion 231*a* of the first region 231 of the guide groove 23*f* prevents a rattle of the clip 440 in the projected state of the pen point 61.

In the process of transfer of the pen point 61 from the projected state to the retracted state, the ball portion 442 of the clip body 441 fits into the through groove 235 from above the first bottom surface 233A in a position passing through the boundary between the front half portion 231*a* and the rear half portion 231*b* in the first region 231 of the guide groove 23*f*. After that, the ball portion 442 moves to the boundary between the second region 232 and the rear half portion 231*b* of the first region 231 along the through groove 235. This allows the pen point 61 to be in the completely retracted state illustrated in FIG. 11B.

As illustrated in FIG. 12B, formation of the through groove 235 in the guide groove 23*f* causes the ball portion 442 to be in the noncontact state in the direction of the biasing force P2 illustrated in FIG. 12A during transfer of the pen point 61 from the projected state to the retracted state. This causes the biasing force P2 of the clip body 441 and the frictional resistance of the ball portion 442 to be zero. Accordingly, the guide groove 23*f* in the present embodiment prevents the rearward movement of the clip 440 from being stopped immediately before the pen point 61 is in the completely retracted state illustrated in FIG. 12B even if the elastic force P1 of the first spring 5 is reduced. That is, in the retractable writing instrument according to the present embodiment, normal movement of the clip 440 is securely performed to cause the pen point 61 to be in the retracted state.

It should be noted that, as illustrated in FIG. 12C, the clip 440 in the present embodiment has a configuration integrally formed of the clip body 441, the ball portion 442, and the clip base 443 by a synthetic resin as a single piece while not being limited to this configuration. For example, the clip body 441 and the clip base 443 may be two separate components made with a synthetic resin. Moreover, the clip body 441, the ball portion 442, and the clip base 443 may be three separate components made with a synthetic resin. These separate components may be fit to each other to configure the one clip 440.

7. Seventh Embodiment

Figure 13A:
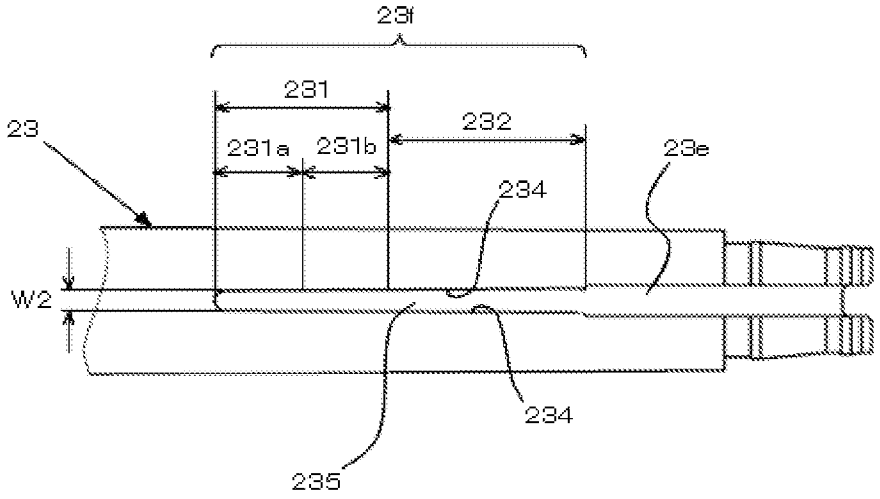
FIG. 13A is a plan view illustrating a rear side portion of an intermediate barrel configuring a retractable writing instrument according to a seventh embodiment of the present invention.

With reference to FIG. 13A, a retractable writing instrument according to the seventh embodiment of the present invention is then described. The retractable writing instrument according to the seventh embodiment is characterized in the configuration of a guide groove 23*f* illustrated in FIG. 13A and has the other configurations same as those in the first or second embodiment described above. Accordingly, in the seventh embodiment below, identical reference signs are given to the same configurations as those in the first or second embodiment described above to omit detailed descriptions.

FIG. 13A illustrates an intermediate barrel 23 of the retractable writing instrument according to the seventh embodiment. The guide groove 23*f* of the retractable writing instrument according to the seventh embodiment has no bottom surface 233 and is configured with a through groove 235 and a pair of side surfaces 234. The through groove 235 in the present embodiment is formed across the entire area from the first region 231 to the second region 232 and continues to the first long hole 23*e*.

The guide groove 23*f* illustrated in FIG. 13A constantly causes the ball portion 42 of the clip body 41 not to produce the biasing force P2 regardless of the state of the pen point 61. This also causes the frictional resistance between the ball portion 42 and the surface of the barrel 2 to be zero. Accordingly, the rearward movement of the clip 4 is prevented from being stopped. That is, in the retractable writing instrument according to the present embodiment, normal movement of the clip 4 is securely performed to cause the pen point 61 to be in the retracted state.

The through groove 235 formed in the second region 232 of the guide groove 23*f* is used when the clip 4 is assembled to the intermediate barrel 23. In the process of assembling the clip 4 to the intermediate barrel 23, the ball portion 42 of the clip body 41 passes through the first long hole 23*e* and is guided to the first region 231 by the through groove 235 formed in the second region 232 of the guide groove 23*f*. This allows the clip 4 to be assembled to the intermediate barrel 23 without causing the ball portion 42 to contact the surface of the intermediate barrel 23.

8. Eighth Embodiment

Figure 13B:
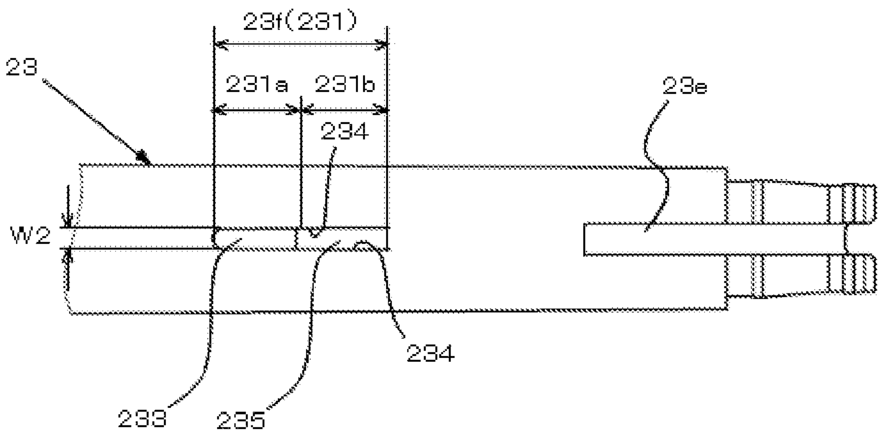
FIG. 13B is a plan view illustrating a rear side portion of an intermediate barrel configuring a retractable writing instrument according to an eighth embodiment of the present invention.

With reference to FIG. 13B, a retractable writing instrument according to the eighth embodiment of the present invention is then described. The retractable writing instrument according to the eighth embodiment is characterized in the configuration of a guide groove 23*f* illustrated in FIG. 13B and has the other configurations same as those in the first or second embodiment described above. Accordingly, in the eighth embodiment below, identical reference signs are given to the same configurations as those in the first or second embodiment described above to omit detailed descriptions.

FIG. 13B illustrates an intermediate barrel 23 of the retractable writing instrument according to the eighth embodiment. The guide groove 23*f* of the retractable writing instrument according to the eighth embodiment only has a first region 231 and has no second region 232. In a front half portion 231*a* of the first region 231, a bottom surface 233 is formed. In a rear half portion 231*b* of the first region 231, a through groove 235 is formed. The guide groove 23*f* in the present embodiment also exhibits technical effects similar to those in the first embodiment described above.

That is, in the projected state of the pen point 61, the ball portion 42 of the clip body 41 is located in the front half portion 231*a* of the first region 231 of the guide groove 23*f*. The ball portion 42 is pressed against the bottom surface 233 of the guide groove 23*f* by the biasing force P2 of the clip body 41. As a result, frictional resistance is produced between the ball portion 42 and the bottom surface 233. The biasing force P2 of the clip body 41 and the frictional resistance of the ball portion 42 exhibit a preferred effect of inhibiting a rattle of the clip 4. That is, the bottom surface 233 formed in the front half portion 231*a* of the first region 231 of the guide groove 23*f* prevents a rattle of the clip 4 in the projected state of the pen point 61.

In the process of transfer of the pen point 61 from the projected state to the retracted state, the ball portion 42 of the clip body 41 fits into the through groove 235 from above the bottom surface 233 in a position passing through the boundary between the front half portion 231*a* and the rear half portion 231*b* in the first region 231 of the guide groove 23*f*. After that, the ball portion 42 moves rearward of the rear half portion 231*b* of the first region 231 along the through groove 235. This causes the pen point 61 to be in the completely retracted state.

As illustrated in FIG. 13B, formation of the through groove 235 in the guide groove 23*f* causes the ball portion 42 to be in the noncontact state in the direction of the biasing force P2 during transfer of the pen point 61 from the projected state to the retracted state. This causes the biasing force P2 of the clip body 41 and the frictional resistance of the ball portion 42 to be zero. Accordingly, the guide groove 23*f* in the present embodiment prevents the rearward movement of the clip 4 from being stopped immediately before the pen point 61 is in the completely retracted state even if the elastic force P1 of the first spring 5 is reduced. That is, in the retractable writing instrument according to the present embodiment, normal movement of the clip 4 is securely performed to cause the pen point 61 to be in the retracted state.

Moreover, the guide groove 23*f* having no second region 232 breaks the continuation of the through groove 235 in the first region 231 and the first long hole 23*e*. This improves the rigidity of the rear side portion of the intermediate barrel 23. As a result, the rear side portion of the intermediate barrel 23 becomes less likely to deflect and allows a transfer film to be efficiently adhered to the surface of the intermediate barrel 23.

9. Ninth Embodiment

Figure 14A:
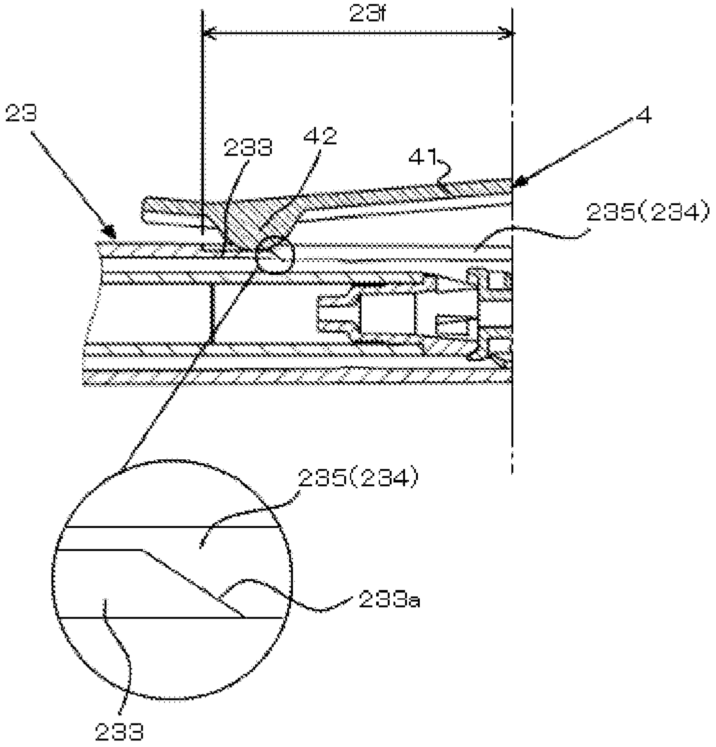
FIGS. 14A and 14B illustrate an internal configuration of a retractable writing instrument according to a ninth embodiment of the present invention.

Preferably, as illustrated in FIG. 14A, an inclined surface 233*a* down to the through groove 235 is formed at a rear end of the bottom surface 233 (or the first bottom surface 233A) of the guide groove 23*f*. Such an inclined surface 233*a* allows the ball portion 42 of the clip body 41 to smoothly go up and down the bottom surface 233. This allows smooth sliding operation of the clip 4 to retract and project the pen point 61.

Figure 14B:
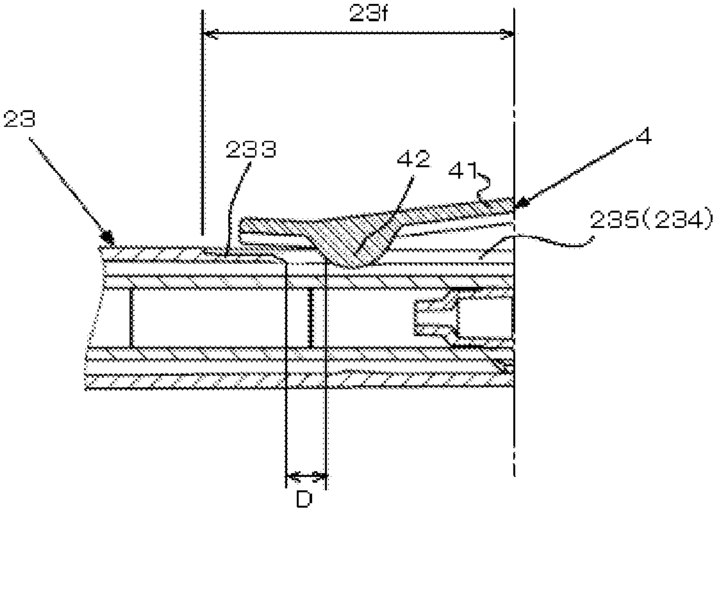
Figure 15A:
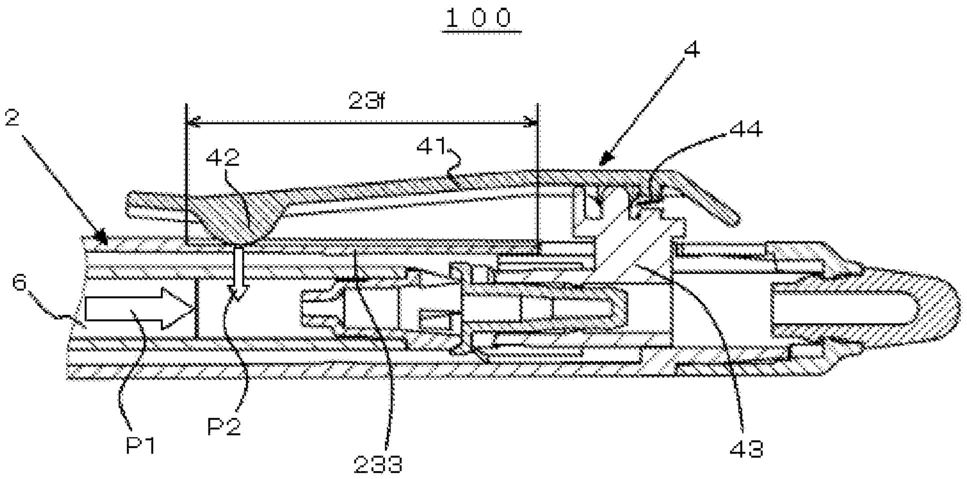
FIGS. 15A and 15B illustrate an internal configuration of a conventional retractable writing instrument.
Figure 15B:
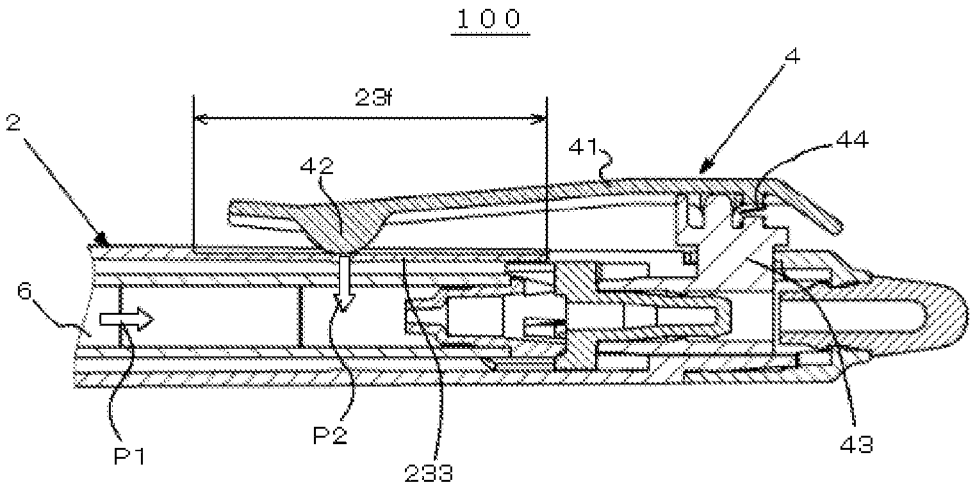

Preferably, as illustrated in FIG. 14B, in the retracted state of the pen point 61, a distance D is formed between the rear end of the bottom surface 233 of the guide groove 23*f* and the ball portion 42 of the clip body 41. Due to the distance D, the ball portion 42 of the clip body 41 fits into the through groove 235 before the pen point 61 is in the completely retracted state and the biasing force P2 of the clip body 41 becomes zero. Moreover, due to the distance D, the surface of the ball portion 42 does not contact the rear end of the bottom surface 233, and in the process of transfer of the pen point 61 from the projected state to the retracted state, frictional resistance is not produced between the surface of the ball portion 42 and the rear end of the bottom surface 233. Such a technical effect of the distance D more securely prevents the rearward movement of the clip 4 from being stopped.

10. Application to "Multi-Pen" Writing Instrument

Figure 16:
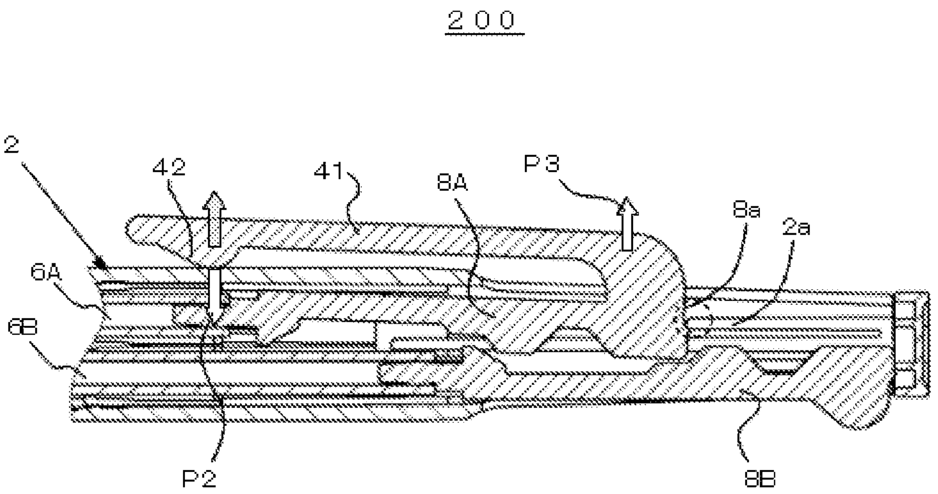
FIG. 16 is a cross-sectional view illustrating an internal configuration of a conventional retractable writing instrument provided with a plurality of writing tool bodies.

The guide groove 23*f* in the seventh embodiment illustrated in FIG. 13A exhibits a particularly marked technical effect when applied to, for example, a retractable writing instrument 200 provided with a plurality of writing tool bodies 6A and 6B as illustrated in FIG. 16.

That is, when the guide groove 23*f* with no bottom surface 233 illustrated in FIG. 13A is applied to the retractable writing instrument 200 illustrated in FIG. 16, the biasing force P2 of the clip body 41 is zero in the projected state of the pen point of the writing tool body 6A. This causes the ball portion 42 of the clip body 41 not to receive a reaction force (refer to the gray arrow in FIG. 16) in the direction opposite to the biasing force P2 from the surface of the barrel 2. As a result, a biasing force P3 (force in a direction away from the surface of the barrel 2) in FIG. 16 is not produced at the rear end portion 8*a* of the slider 8A. This prevents accidental removal of the locking of the rear end portion 8*a* of the slider 8A on the locking rib 2*a*. In other words, the projected state of the pen point of the writing tool body 6A is securely retained.

DESCRIPTION OF REFERENCE NUMERALS

1 Retractable Writing Instrument
2 Barrel
20 Slide Hole
21 Tip
21*a* Front End Hole
22 Front Barrel
22*a* Grip
23 Intermediate Barrel
23*a* Cam Gear
23*b* Cam Groove
23*e* First Long Hole
23*f* Guide Groove
231 First Region
231*a* Front Half Portion
231*b* Rear Half Portion
232 Second Region
233 Bottom Surface
233A First Bottom Surface
233B Second Bottom Surface
233*a* Inclined Surface
234 Side Surface
235 Through Groove
24 Rear Barrel
24*a* Second Long Hole
24*b* Attachment Hole
3 Rotary Member
31 Convex Thread
4 Clip
41 Clip Body
41*a* Upper Wall
41*b* Side Wall
41*c* Bearing Hole
41*d* Projection
42 Ball Portion
43 Clip Base
43*a* Slider
43*b* Rotating Shaft
43*c* Coupling Portion
43*d* Cylindrical Portion
43*e* Cam Gear
43*f* Projection
43*g* Stopper
44 Second Spring
5 First Spring
6 Writing Tool Body
61 Pen Point
62 Ink Storage Tube

63 Thermochromic Ink
64 Follower
65 End Plug
7 Friction Unit
410, 420, 430, 440 Clip
411, 421, 431, 441 Clip Body
412, 422, 432, 442 Ball Portion
413, 423, 433, 443 Clip Base
414 Leaf Spring
434 Side Wall
D Distance

The invention claimed is:

1. A retractable writing instrument, comprising a pen point, a barrel, and a clip, the pen point being configured to be in a state of projecting from the barrel or a state of being retracted into the barrel by sliding the clip in a longitudinal direction of the barrel, wherein the clip comprises a clip body extending in the longitudinal direction of the barrel, a ball portion provided on a front side of the clip body and projecting in a direction of a surface of the barrel, and a clip base provided on a rear side of the clip body and is configured to produce a biasing force in a direction of a surface of the barrel, the surface of the barrel comprises a guide groove extending in the longitudinal direction of the barrel and provided with a pair of side surfaces to restrict lateral movement of the ball portion, the guide groove has a through groove capable of causing the ball portion to be in a noncontact state in a direction of the biasing force at least when the pen point is in the retracted state, and the through groove has a length in the longitudinal direction of the barrel to allow the ball portion to move rearward at least from just before the retracted state of the pen point to the retracted state of the pen point.

2. The retractable writing instrument according to claim 1, wherein the through groove of the guide groove has a length allowing the ball portion to be in the noncontact state in the direction of the biasing force during transfer of the pen point from the projected state to the retracted state.

3. The retractable writing instrument according to claim 1, wherein the barrel has a rear side provided with a slide hole to cause the clip base to slide in the longitudinal direction of the barrel, the slide hole comprises a pair of side surfaces extending in the longitudinal direction of the barrel to restrict lateral movement of the clip base, and each side surface of the slide hole is continued to the corresponding side surface of the guide groove.

4. The retractable writing instrument according to claim 3, wherein the through groove of the guide groove is in communication with the slide hole.

5. The retractable writing instrument according to claim 3, wherein the guide groove has a bottom surface capable of receiving the biasing force from the clip by contacting the ball portion when the pen point is in the projected state.

6. The retractable writing instrument according to claim 5, wherein a second bottom surface separated from the bottom surface by the through groove is provided between the through groove of the guide groove and the slide hole.

7. The retractable writing instrument according to claim 1, wherein the guide groove has a bottom surface capable of receiving the biasing force from the clip by contacting the ball portion when the pen point is in the projected state.

8. The retractable writing instrument according to claim 7, wherein an inclined surface down to the through groove is formed at a rear end of the bottom surface of the guide groove.

9. The retractable writing instrument according to claim 1, wherein the clip comprises a hinge connecting the clip base to the rear side of the clip body and a spring pressing the rear side of the clip body in a direction intersecting the barrel, and the clip body pressed by the spring produces the biasing force.

10. The retractable writing instrument according to claim 1, wherein the clip comprises a leaf spring connecting the rear side of the clip body to the clip base and pressing in the direction of the surface of the barrel, and the clip body pressed by the leaf spring produces the biasing force.

11. The retractable writing instrument according to claim 1, wherein the clip body is configured with sheet metal, the rear side of the clip body is connected to the clip base, and the biasing force is produced by elasticity of the clip body.

12. The retractable writing instrument according to claim 11, wherein the clip body has a pair of side walls configured with the sheet metal.

13. The retractable writing instrument according to claim 1, wherein the clip body, the ball portion, and the clip base are formed of a synthetic resin, and the biasing force is produced by elasticity of the clip body.

* * * * *